United States Patent
Pandey et al.

(10) Patent No.: US 8,959,232 B2
(45) Date of Patent: Feb. 17, 2015

(54) IMS AND MMS INTERWORKING

(75) Inventors: Vinod Pandey, Redmond, WA (US);
Matthew Stafford, Austin, TX (US);
Kan Schlieber, Roswell, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 1437 days.

(21) Appl. No.: 12/346,271

(22) Filed: Dec. 30, 2008

(65) Prior Publication Data
US 2010/0167762 A1 Jul. 1, 2010

(51) Int. Cl.
*G06F 15/16* (2006.01)
*H04W 4/12* (2009.01)
*H04W 80/10* (2009.01)
*H04L 29/06* (2006.01)

(52) U.S. Cl.
CPC .............. *H04W 4/12* (2013.01); *H04W 80/10* (2013.01); *H04L 65/1016* (2013.01)
USPC ...................................................... 709/227

(58) Field of Classification Search
CPC .............. H04L 51/066; H04L 12/5835; H04L 12/5895; H04L 51/38; H04L 67/2823
See application file for complete search history.

(56) References Cited

U.S. PATENT DOCUMENTS

| | | | | |
|---|---|---|---|---|
| 6,910,074 B1 * | 6/2005 | Amin et al. | ............ | 709/227 |
| 6,950,876 B2 * | 9/2005 | Bright et al. | ............ | 709/230 |
| 6,992,995 B2 | 1/2006 | Agrawal et al. | | |
| 7,069,301 B2 * | 6/2006 | Jerbi et al. | ............ | 709/206 |
| 7,092,381 B2 | 8/2006 | Carlsson et al. | | |
| 7,092,707 B2 * | 8/2006 | Lau et al. | ............ | 455/423 |
| 7,228,143 B1 | 6/2007 | Hamalainen et al. | | |
| 7,392,184 B2 | 6/2008 | Viikki et al. | | |
| 7,502,345 B2 | 3/2009 | Aaltonen | | |
| 7,590,066 B2 * | 9/2009 | Laumen et al. | ............ | 370/238 |
| 7,623,498 B2 | 11/2009 | Lundstrom | | |
| 7,630,705 B2 * | 12/2009 | Galicia et al. | ............ | 455/414.1 |
| 7,643,450 B2 | 1/2010 | Marinescu et al. | | |
| 7,702,342 B2 * | 4/2010 | Duan | ............ | 455/466 |
| 7,720,029 B2 | 5/2010 | Orava et al. | | |
| 7,746,864 B1 * | 6/2010 | Asawa et al. | ............ | 370/392 |
| 7,835,742 B2 | 11/2010 | Jaakkola et al. | | |
| 7,835,758 B2 * | 11/2010 | Tu et al. | ............ | 455/466 |

(Continued)

OTHER PUBLICATIONS

Wikipedia, Network Switching Subsystem, pp. 1-7.*

(Continued)

*Primary Examiner* — Backhean Tiv
(74) *Attorney, Agent, or Firm* — Amin, Turocy & Watson, LLP

(57) ABSTRACT

A method for providing multimedia message service (MMS) in an Internet protocol (IP) multimedia subsystem (IMS) network can include establishing a first session initiation protocol (SIP) session between a source IMS device and a next generation multimedia message service center (NG MMSC), encapsulating, at the source IMS device, an MMS message in a message session relay protocol (MSRP) message, transmitting the MSRP message from the IMS device to the NG MMSC; and storing the MMS message at the NG MMSC for further delivery to the destination device. The method can further include transmitting the MMS message to a destination legacy device via legacy MMS protocols or transmitting the MMS message to a destination IMS device via MSRP. Alternative methods can include receiving a legacy MMS message and delivering the MMS message to a destination IMS device via MSRP. Systems for providing MMS in an IMS network are also described.

18 Claims, 18 Drawing Sheets

(56) References Cited

U.S. PATENT DOCUMENTS

| | | | |
|---|---|---|---|
| 7,848,336 B2 | 12/2010 | Hamel et al. | |
| 7,889,716 B2* | 2/2011 | Tejani et al. | 370/352 |
| 7,957,403 B2* | 6/2011 | Jansson | 370/401 |
| 8,244,814 B1* | 8/2012 | Brown et al. | 709/206 |
| 2004/0057403 A1 | 3/2004 | Jerbi et al. | 370/329 |
| 2004/0078349 A1* | 4/2004 | Syrjala et al. | 705/412 |
| 2004/0103157 A1* | 5/2004 | Requena et al. | 709/206 |
| 2004/0266411 A1* | 12/2004 | Galicia et al. | 455/414.4 |
| 2005/0249150 A1* | 11/2005 | Johnson et al. | 370/328 |
| 2005/0259652 A1* | 11/2005 | Tang et al. | 370/389 |
| 2005/0265525 A1* | 12/2005 | Tang et al. | 379/88.13 |
| 2006/0128387 A1 | 6/2006 | Kim | |
| 2006/0149811 A1* | 7/2006 | Bennett et al. | 709/203 |
| 2006/0168003 A1 | 7/2006 | Vau et al. | |
| 2007/0076857 A1* | 4/2007 | Chava et al. | 379/88.17 |
| 2007/0133505 A1* | 6/2007 | Kuchenhoff et al. | 370/352 |
| 2007/0156909 A1* | 7/2007 | Osborn et al. | 709/227 |
| 2007/0206568 A1* | 9/2007 | Silver et al. | 370/352 |
| 2007/0206613 A1* | 9/2007 | Silver et al. | 370/401 |
| 2007/0232337 A1 | 10/2007 | Yu | |
| 2007/0265855 A1 | 11/2007 | Maandag et al. | |
| 2008/0072298 A1* | 3/2008 | Dal Canto et al. | 726/6 |
| 2008/0090553 A1* | 4/2008 | Wan et al. | 455/413 |
| 2008/0123673 A1 | 5/2008 | Lee | |
| 2008/0139112 A1* | 6/2008 | Sampath et al. | 455/3.04 |
| 2008/0183828 A1* | 7/2008 | Sehgal et al. | 709/206 |
| 2008/0186929 A1 | 8/2008 | Rice et al. | |
| 2008/0240117 A1* | 10/2008 | Gavita et al. | 370/400 |
| 2008/0261590 A1* | 10/2008 | Tso | 455/432.2 |
| 2008/0305813 A1 | 12/2008 | Rao | |
| 2009/0029723 A1* | 1/2009 | Doyle et al. | 455/466 |
| 2009/0037539 A1* | 2/2009 | Postmus | 709/206 |
| 2009/0049202 A1* | 2/2009 | Pattison et al. | 709/249 |
| 2009/0086725 A1* | 4/2009 | Lai et al. | 370/352 |
| 2009/0106107 A1 | 4/2009 | Guenster et al. | |
| 2009/0111432 A1 | 4/2009 | Wilson et al. | |
| 2009/0129372 A1 | 5/2009 | Pandey et al. | |
| 2009/0156170 A1* | 6/2009 | Rossano et al. | 455/412.1 |
| 2009/0186637 A1 | 7/2009 | Sonntag | |
| 2009/0193433 A1* | 7/2009 | Maes | 719/315 |
| 2009/0222893 A1* | 9/2009 | Jeong et al. | 726/4 |
| 2009/0285129 A1* | 11/2009 | Swanburg et al. | 370/259 |
| 2009/0291697 A1* | 11/2009 | Kit Tam et al. | 455/466 |
| 2009/0319412 A1 | 12/2009 | Karlsson | |
| 2010/0029308 A1* | 2/2010 | Tims et al. | 455/466 |
| 2010/0056118 A1* | 3/2010 | Galicia et al. | 455/414.4 |
| 2010/0075699 A1* | 3/2010 | Kupsh et al. | 455/466 |
| 2010/0146066 A1* | 6/2010 | Bian et al. | 709/206 |
| 2010/0167762 A1* | 7/2010 | Pandey et al. | 455/466 |
| 2010/0169424 A1* | 7/2010 | Gustafsson et al. | 709/206 |
| 2010/0215015 A1* | 8/2010 | Miao et al. | 370/329 |
| 2010/0281120 A1* | 11/2010 | Robke | 709/206 |
| 2010/0285777 A1* | 11/2010 | Golobrodsky et al. | 455/412.2 |
| 2011/0093940 A1* | 4/2011 | Dal Canto et al. | 726/7 |
| 2013/0227059 A1* | 8/2013 | Bonefas et al. | 709/217 |
| 2014/0125753 A1* | 5/2014 | Rossano et al. | 348/14.02 |

OTHER PUBLICATIONS

Wikipedia, MMS Architecture, pp. 1-3.*
Kurki, Jouko, Messaging in GPRS/3G networks: Introduction to Multimedia messaging Services(MMS), Wireless Application Protocol(WAP), and IP Multimedia Subsystem(IMS), Apr. 4, 2005, pp. 1-54.*
Wikipedia, IP Multimedia Subsystem, pp. 1-15.*
OA dated Sep. 29, 2011 for PCT Application No. 12/014415, 13 pages.
Notice of Allowance dated Jan. 12, 2012 for U.S. Appl. No. 12/014,415, 23 pages.

* cited by examiner

IMS AND MMS INTERWORKING

TECHNICAL FIELD

The subject disclosure relates generally to telecommunications networks and, more particularly, to Internet protocol (IP) multimedia subsystem (IMS) and multimedia message service (MMS) interworking.

BACKGROUND

The wireless telecommunications industry has seen tremendous growth over the last several years. Many of today's mobile devices, such as mobile phones and personal digital assistants (PDAs), can be used as full-service computing devices. For example, many of the most recent and advanced mobile device can be configured to run a variety of software including productivity software (e.g., word processing, spreadsheet, presentation), communication software (e.g., email, messaging, chat, VoIP), entertainment software (e.g., games, video, audio), and various other types of software. In general, applications previously reserved for computing devices are now available on today's mobile devices. This expansion in capability of mobile device has largely been effectuated by the telecommunications industry shift to fixed-mobile convergence.

The rapid growth of the telecommunications industry has fueled a strong competition for market shares in mobile-IP communications devices and communication service plans. This competition has prompted mobile operators to create packet based data networks that can provide mobile devices IP access to the Internet and other IP-based network resources and applications. In addition, mobile operators maintain traditional mobile voice networks that provide mobile devices access to voice communications from nearly anywhere. Further, mobile data and voice networks can interconnect with the public switched telephone network (PSTN), providing the mobile device with as much interconnectivity as traditional landline telephony but with far greater mobility and flexibility.

As the wireless telecommunications market increases, the number of mobile subscribers increase, and the demand for voice and data network resources will see a corresponding increase. Mobile operators must expand access network and core network infrastructure to facilitate such demand.

SUMMARY

Systems and methods for providing multimedia message service (MS) in an Internet protocol (IP) multimedia subsystem (IMS) network are disclosed herein. According to one exemplary embodiment of the subject disclosure, a method includes establishing a first session initiation protocol (SIP) session between a source IMS device and a next generation multimedia message service center (NG MMSC), encapsulating, at the source IMS device, an MMS message in a message session relay protocol (MSRP) message, transmitting the MSRP message from the IMS device to the NG MMSC, and storing the MMS message at the NG MMSC for further delivery to the destination device.

According to some embodiments of the subject disclosure, the method can further include establishing a second SIP session between the NG MMSC and the destination device, wherein the destination device is an IMS device, and transmitting the MMS message from the NG MMSC to the destination IMS device via MSRP. In alternative embodiments, the method can further include transmitting the MMS message from the NG MMSC to a destination IMS device via MSRP during the first SIP session.

According to some embodiments of the subject disclosure, the method can further include transmitting the MMS message to the destination device via legacy MMS protocols, wherein the destination device is a legacy device.

According to some embodiments of the subject disclosure, the method can further include querying a subscriber database to determine whether the destination device is a legacy device or an IMS device. If it is determined that the destination device is a legacy device, the method includes transmitting the MMS message to the destination device via legacy MMS protocols. If it is determined that the destination device is an IMS device, the method includes establishing a second SIP session between the NG MMSC and the destination device, and transmitting the MMS message from the NG MMSC to the destination IMS device via MSRP.

According to some embodiments of the subject disclosure, the method can further include querying a pre-paid system to determine if the destination device is associated with a pre-paid billing account.

According to some embodiments of the subject disclosure, the method can further include querying one of a home location register (HLR) and a home subscriber server (HSS) to determine if the destination device is registered prior to transmitting the MMS message to the destination device.

According to some embodiments of the subject disclosure, the method can further include generating, at the NG MMSC, a call detail record (CDR), and sending the CDR to a billing system for billing purposes.

According to another exemplary embodiment of the subject disclosure, a system can include a source IMS device, a destination device, and an NG MMSC. The NG MMSC can be configured to establish a first SIP session with the source IMS device in response to a SIP invite message received from the source IMS device. The NG MSSC can be further configured to receive, from the source IMS device, an MSRP message that includes an encapsulated MMS message, and store the MMS message for further delivery to the destination device.

According to some embodiments of the subject disclosure, the NG MMSC can be further configured to establish a second SIP session with the destination device, and transmit the MMS message to the destination IMS device via MSRP.

According to some embodiments of the subject disclosure, the NG MMSC can be further configured to transmit the MMS message to the destination device via legacy MMS protocols.

According to some embodiments of the subject disclosure, the NG MMSC can be further configured to query a subscriber database to determine the technology type of the destination device. The technology type can be either a legacy device or an IMS device. If it is determined that the destination device is a legacy device, the NG MMSC can transmit the MMS message to the destination device via legacy MMS protocols. If the destination device is an IMS device, the NG MMSC can establish a second SIP session with the destination device, and transmit the MMS message to the destination IMS device via MSRP.

According to some embodiments of the subject disclosure, the NG MMSC can be further configured to query a pre-paid system to determine if the destination device is associated with a pre-paid billing account.

According to some embodiments of the subject disclosure, the NG MMSC can be further configured to query one of a home location register (HLR) and a home subscriber server (HSS) to determine if the destination device is registered prior to transmitting the MMS message to the destination device.

According to some embodiments of the subject disclosure, the NG MMSC can be further configured to generate a CDR, and send the CDR to a billing system for billing purposes.

According to some embodiments of the subject disclosure, the NG MMSC can include an IP MMS gateway to facilitate communication via MSRP, SIP, and diameter protocols.

According to another exemplary embodiment of the subject disclosure, a method can include receiving, at an NG MMSC, a legacy MMS message addressed to a destination IMS device, storing the MMS message, establishing a SIP session between the destination IMS device and the NG MMSC, encapsulating the MMS message in an MSRP message, and transmitting the MSRP message to the destination IMS device.

According to some embodiments of the subject disclosure, the method can further include querying a pre-paid system to determine if the destination device is associated with a pre-paid billing account.

According to some embodiments of the subject disclosure, the method can further include querying an HSS to determine if the destination device is registered prior to transmitting the MMS message to the destination device.

According to some embodiments of the subject disclosure, the method can further include generating a CDR, and sending the CDR to a billing system for billing purposes.

DETAILED DESCRIPTION

As required, detailed embodiments of the subject disclosure are disclosed herein. It must be understood that the disclosed embodiments are merely exemplary examples of the disclosure that may be embodied in various and alternative forms, and combinations thereof. As used herein, the word "exemplary" is used expansively to refer to embodiments that serve as an illustration, specimen, model or pattern. The figures are not necessarily to scale and some features may be exaggerated or minimized to show details of particular components. In other instances, well-known components, systems, materials or methods have not been described in detail in order to avoid obscuring the subject disclosure. Therefore, specific structural and functional details disclosed herein are not to be interpreted as limiting, but merely as a basis for the claims and as a representative basis for teaching one skilled in the art to variously employ the subject disclosure.

Figure 1:
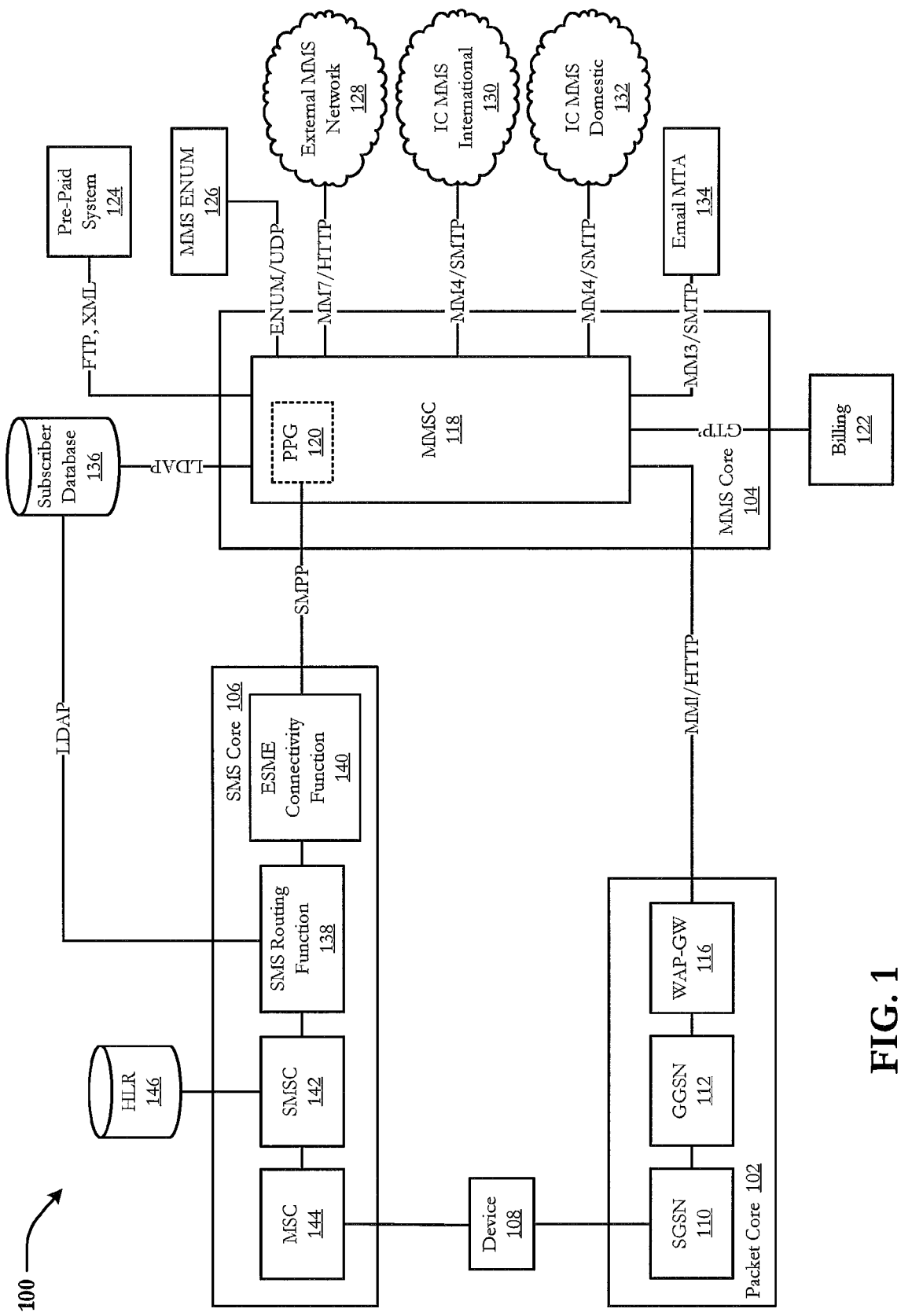
FIG. 1 illustrates an exemplary Multimedia Message Service (MMS) architecture.

Referring now to the drawings wherein like numerals represent like elements throughout the several views, FIG. 1 illustrates an MMS architecture 100. The illustrated MMS architecture 100 includes a packet core network 102, an MMS core network 104, a short message service (SMS) core network 106, and a mobile device 108.

The mobile device 108 can be a cellular telephone, a personal digital assistant, a handheld computing device, a computer, a global positioning system (GPS) unit, a video game system, a music player, a video player, combinations thereof, and the like. The mobile device 108 is illustrated as being in communication with the packet core network 102 via a serving Generic Packet Radio Service (GPRS) support node (SGSN) 110.

The SGSN 110 can be configured to record and track the location of a mobile device within a wireless telecommunications network. The SGSN 110 also provides security functions and access control functions. The SGSN 112, in turn, is in communication with a gateway GPRS support node (GGSN) 112. The GGSN 112 can be configured to provide an edge routing function within a GPRS network to external packet data networks, such as the Internet and one or more intranets, for example. The GGSN 112 can also be configured to provide firewall and filtering functionality. The GGSN 112 can provide the capability to examine device IP packets above the IP and transfer control protocol (TCP)/user datagram protocol (UDP) protocol layers so as to enable content-based billing. The GGSN 112 can generate CDRs and pass them to the billing system 122. The GGSN 112 is in communication with a wireless application protocol (WAP) gateway (WAP-GW) 116. The WAP-GW 116 is illustrated as being in communication with the MMS core network 104, specifically an MMS center (MMSC) 118 via an MM!/HTTP protocol interface. The WAP-GW 116 can be configured to push MMS content to the MMSC 118 for further delivery to a destination device.

The MMSC 118 can be configured to provide a store and forward facility for multimedia messages. The MMSC 118 can also provide formatting functions to enable messages to be optimized based upon the destination devices capability. The illustrated MMSC 118 includes a push proxy gateway (PPG) 120. The PPG 120 can be configured to push notifications to a destination device with instructions to retrieve an MMS message. For example, the PPG 120 can create and send a notification that includes a URL link to retrieve an MMS message or content associated therewith. The PPG 120 is illustrated as being a function local to the MMSC 118, although this is not necessarily the case. In some embodiments, the PPG 120 can be located external to the MMSC 118. In either case and for brevity, the PPG 120 functions are often referred to herein as being performed by the MMSC 118.

The MMSC 118 is illustrated as being in communication with a billing system 122 via a GTP' interface. The billing system 122 can be configured to receive call detail records (CDRs) from the MMSC 118 and bill a subscriber account accordingly.

The MMSC 118 is also in communication with a pre-paid system 124 via an file transfer protocol (FTP), extensible markup language (XML) protocol interface. The MMSC 118 can query the pre-paid system 124 to determine whether a subscriber (source or destination) is a pre-paid subscriber and communicate with the billing system 122 to bill the subscriber accordingly.

The MMSC 118 is also in communication with an MMS ENUM system 126 via an ENUM/UDP protocol interface. The MMS ENUM system 126 can be configured to map mobile subscriber numbers (e.g., mobile station international ISDN numbers) to webpage addresses, such as URLs. The ENUM service can be used to provide links based upon a subscriber's number to MMS content served by the MMSC 118, for example.

The MMSC 118 is also in communication with one or more external MMS networks 128 via an MM7/HTTP protocol interface, one or more international inter-exchange carriers (ICs) 130 via an NN4/SMTP protocol interface, one or more domestic ICs 132 via an MM4/SMTP protocol interface, and an email message transfer agent (MTA) 134. The external MMS network 128 can include MMS networks provided by other mobile operators, for example. The international and domestic ICs 130, 132 can provide a single interface through which a mobile operator can communicate with other international and domestic mobile operators.

The MMSC 118 is also in communication with a subscriber database 136 via an LDAP protocol interface. The subscriber database 136 can be configured to store subscriber information for all subscribers served by a mobile operator. Subscriber information can include, but is not limited to, name, address, telephone number, device type, device capabilities, service plan information, credit information, billing information, combinations thereof, and the like. The MMSC 118 can communicate with the subscriber database 136 to acquire the technology type of a destination subscriber's device, for example, to determine how to deliver a received MMS message.

The illustrated subscriber database 136 is in communication with an SMS routing function 138 that can be configured to receive an SMS message and determine location information associated with a sender (source) and a recipient (destination) of such message. The SMS routing function 138 can forward the message to an SMS network for routing if the destination device is capable of receiving the message, as determined from the subscriber database 136, for example. An SMS message can be a notification SMS that includes a URL link to retrieve an MMS message or content associated therewith.

The SMS routing function 138 is illustrated as being in communication with an external short message entity (ESME) connectivity function 140 that, in turn, is illustrated as being in communication with the MMSC 118 via an short message peer-to-peer (SMPP) protocol interface. The SMS routing function 138 is also illustrated as being in communication with an SMS center (SMSC) 142 that, in turn, is in communication with a home location register (HLR) 146 and a mobile switching center (MSC) 144. The SMSC 142 can be configured to store and forward an SMS message to the destination device. The HLR 146 is a database configured to provide routing information for mobile terminated (MT) calls and SMS messages. The HLR 117 is also configured to maintain subscriber data that is distributed to the relevant VLR (not shown) or the SGSN 110 through the attach process and mobility management procedures, such as location area and routing area updates. The HLR 146 can be logically associated with an authentication center (AuC, not shown). The AuC can be configured to authenticate each subscriber identity module (SIM) card that attempts to connect to the network, for example, when a mobile device is powered on. The MSC 144 can be configured to function as a telecommunications switch and is in communication with location databases, such a VLR and the HLR 146. The VLR (not shown) can be logically associated with the MSC 144 or can be separate from the MSC 144. The VLR is a database configured to store all subscriber data that is required for call processing and mobility management for mobile subscribers that are currently located in an area controlled by the MSC 144. The MSC 144 is also illustrated as being in communication with the device 108.

Generally, the MMS architecture 100 can operate in any wireless network using any existing or yet to be developed telecommunications technology. The wireless network can provide voice service via telecommunications technologies including, but not limited to, networks utilizing Time Division Multiple Access (TDMA), Frequency Division Multiple Access (FDMA), Global System for Mobile communications (GSM), Universal Mobile Telecommunications System (UMTS), Wideband Code Division Multiple Access (WCDMA), Orthogonal Frequency Division Multiplexing (OFDM), and various other 2G, 2.5G and 3G (third generation) and above (4G and beyond) technologies. The wireless network can also provide data service via telecommunications technologies including, but not limited to, GPRS, Enhanced Data rates for Global Evolution (EDGE), the High-Speed Packet Access (HSPA) protocol family, such as, High-Speed Downlink Packet Access (HSPDA), Enhanced Uplink (EUL) or otherwise termed High-Speed Uplink Packet Access (HSUPA), Evolved HSPA (HSPA+), and various other current and future data technologies.

Figure 2:
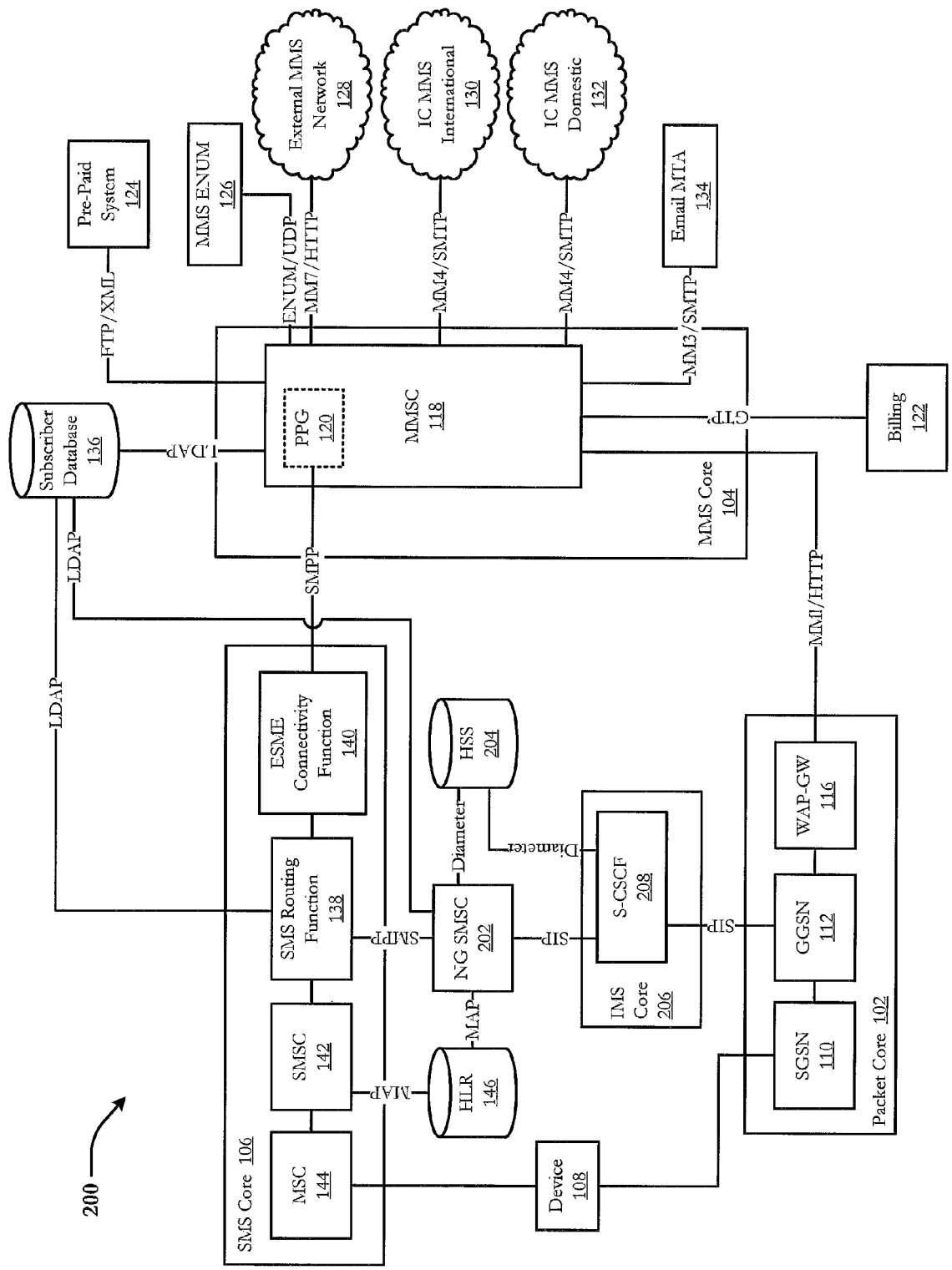
FIG. 2 illustrates an MMS architecture for interworking with an Internet Protocol (IP) Multimedia Subsystem (IMS) network to provide MMS, according to an exemplary embodiment of the subject disclosure.

Referring now to FIG. 2, an MMS architecture 200 for interworking with an Internet Protocol (IP) Multimedia Subsystem (IMS) network to provide MMS for IMS devices is illustrated, according to an exemplary embodiment of the subject disclosure. Several aspects of the illustrated MMS architecture 200 are similar or illustrated in much the same manner as MMS architecture 100 in FIG. 1. Accordingly, these aspects are not described again here.

The illustrated MMS architecture 200 includes a next generation (NG) SMSC 202 that can interface directly with the legacy SMS core 106 via the SMSC 142 or the SMS routing function 138 (as illustrated) and an IMS core 204 via a serving call session control function (S-CSCF) 208, for example. Exemplary protocol interfaces using SMPP and session initiation protocol (SIP) are illustrated. The NG SMSC 202 can also interface with a home subscriber server (HSS) 206 for retrieving location and routing information for IMS subscribers. The HSS 206 can be configured to perform the functions of an HLR (e.g., the HLR 146) for IMS subscribers, for example.

The NG SMSC 202 does not require changes to a legacy SMSC or to an S-CSCF of an IMS network to provide interworking functionality between such IMS/SMS components and core networks. Instead, a vendor-specific routing function can receive incoming messages, determine whether the destination device is SMS and/or IMS capable, and forward the message accordingly. Specifically, if the destination device is an SMS device, the routing function can forward the SMS message to a legacy SMSC for handling as specified by legacy SMS procedures. If the destination device is an IMS device, the routing function can forward the SMS device to the NG SMSC 202 for routing, delivery, and/or charging functions.

As described immediately above, changes to the legacy SMSC 142 are not required to provide IMS/SMS interworking functionality. A direct benefit of this is that vendors and operators can add or remove NG SMSCs 202 into/from their networks to handle IMS/SMS interworking functionality as the IMS subscriber base changes. For example, if an operator has tens of millions of legacy SMS customers, and one hundred thousand IMS subscribers, it could be prohibitively expensive to upgrade an entire network to handle IMS/SMS interworking functionality for all messages including, for example, updating/upgrading all HLRs to standard compliant HSSs, or updating all legacy SMSCs to communicate with currently available IMS-only HSSs. Instead, a single NG SMSC 202 can be added to handle all SMS to IMS messages and IMS to SMS messages. IMS messages bound to SMS subscribers can be received by the NG SMSC 202 and forwarded to the legacy SMS core 106 for standard routing and charging, without requiring updates to the legacy SMSC 142. Accordingly, network operators or vendors can add the NG SMSC 202 as the IMS subscriber base justifies, rather than overhauling the existing network(s) to provide legacy SMSC functionality.

The MMS architecture 200 can be implemented without changing legacy SMSC functions and protocols. The NG SMSC 102 can receive mobile application part (MAP) messages from the legacy MAP protocol messages and SIP protocol messages, and convert such messages from a MAP protocol to a SIP protocol and vice versa. For example, the legacy SMSC 142 can communicate with the HLR 146 via MAP protocol to retrieve location and routing information for a destination legacy device. The HLR 146 can also communicate with the NG SMSC 202 via MAP protocol to retrieve like information for destination legacy device. It is contemplated that in certain embodiments the NG SMSC can replace the legacy SMSC 142 entirely. In this embodiment, the NG SMSC 202 could be configured to communicate with the other legacy SMS core 106 components to perform substantially the same functions as the illustrated legacy SMSC 142 and functions of the illustrated NG SMSC 202 with regard to handling SMS messages that originate from or are bound to an IMS device.

The NG SMSC 202 can interconnect components of a legacy SMS core network, such as the illustrated SMS core network 106, and an IMS network, such as the illustrated IMS core network 204, to provide interworking functionality among SMS and IMS devices to send and receive SMS-based messages including SMS notification messages for use to notify a legacy or IMS device of an MMS message.

The foregoing has described both legacy and IMS devices. The illustrated device 108 can be configured as a legacy device, such as a legacy mobile station or user equipment (MS/UE) device. As a legacy device, the device 108 may be limited to using circuit-switched SMS related protocols (e.g., MAP, SS7) for SMS communications. As an IMS device, the device 108 can include an IMS client that is capable of performing IMS functions, such as, but not limited to, SIP registration, SIP deregistration, and the like. Further, in either case, the device 108 can be configured to convert user text to SMS messages as defined by various suitable SMS standards, such as standardized by 3GPP. The IMS device 108 can generate a native SMS message and/or such device can encapsulate an SMS message within a SIP message. The SIP message can be routed via the IMS core network 204. The IMS device 108 can also de-encapsulate an SIP-encapsulated SMS message and present such message to a user as text. It is contemplated that the IMS device 108 can function as a legacy device when network coverage affords only legacy services, such as legacy SMS. It is further contemplated that the IMS device 108 can function according to IMS protocols when IMS network coverage is available.

The NG SMSC 202 can perform various charging and routing functions in both the SMS core network 106 and the IMS core network 204. For example, the NG SMSC 102 can access the HLR 146, the HSS 206, and a vendor/operator-specific SMS location registry such as a master subscriber database (e.g., subscriber database 136). In some embodiments, the HLR 146 and the HSS 206 can be combined as a single standards-based IMS HSS that includes both HLR data and IMS subscriber data. Accordingly, the illustrated MMS architecture 200 can provide location and routing functionality for legacy and IMS devices operating on either the SMS core network 106 or the IMS core network 204, without requiring changes to currently available network components to handle charging and location/routing functions. Thus, the illustrated MMS architecture 200 can provide an efficient interface between SMS and IMS networks with minimal or no changes to current network components and protocols.

The NG SMSC 202 can include a gateway function that can be configured to receive SIP protocol and MAP protocol messages and convert such messages between protocols. For example, the gateway function can receive a SIP message and convert the SIP message to a MAP message if the destination device is legacy device. The converted MAP message can be forwarded to components of the SMS core network 106 for further handling. By further example, the gateway function can receive a MAP message and convert the MAP message to a SIP message if the destination device is an IMS device. The converted SIP message can be forwarded to the IMS core network 204 for further handling.

The NG SMSC 202 can further include a routing function that can apply communication policies IMS and/or SMS messages. For example, the routing function can query the pre-paid system 124 to determine if the destination subscriber is a pre-paid or post-paid subscriber for charging and billing purposes.

The NG SMSC 202 can further include a delivery function that can determine location information associated with a message source and a message destination. The delivery function can communicate with the HLR 146 and/or the HSS 206 to determine location and routing information for source and destination devices (e.g., legacy and IMS). In addition, the delivery function can provide store and forward function for IMS message and SMS messages bound for destination legacy and IMS devices. Accordingly, IMS and SMS interconnectivity can be provided without modifying core network components (e.g., the SMSC 142 or the S-CSCF 208) to enable such components to access location registries of disparate networks operating on disparate communication protocols.

In the illustrated MMS architecture 200, the SMS routing function 138 can receive an SMS message and determine location information associated with the sender and recipient of the message. The SMS routing function 138 can forward the message to the SMS message to the SMSC 142 for storage and forwarding to the destination device if the destination device is a legacy SMS device or an IMS/SMS device. If the destination device is an IMS or IMS/SMS device coupled to the IMS core network 204, the SMS routing function 138 can forward the message to the NG SMSC 202. The NG SMSC 202 can perform conversion to SIP protocol, and location, routing, and charging functions associated with the message, as discussed above. Accordingly, the MMS architecture 200 can bypass the NG SMSC 202 for SMS to SMS messages, utilizing only the SMS routing function 138 and the SMS core network 106, and can therefore provide SMS/IMS interworking functionality without requiring changes to standardized SMS or IMS network components.

Figure 3:
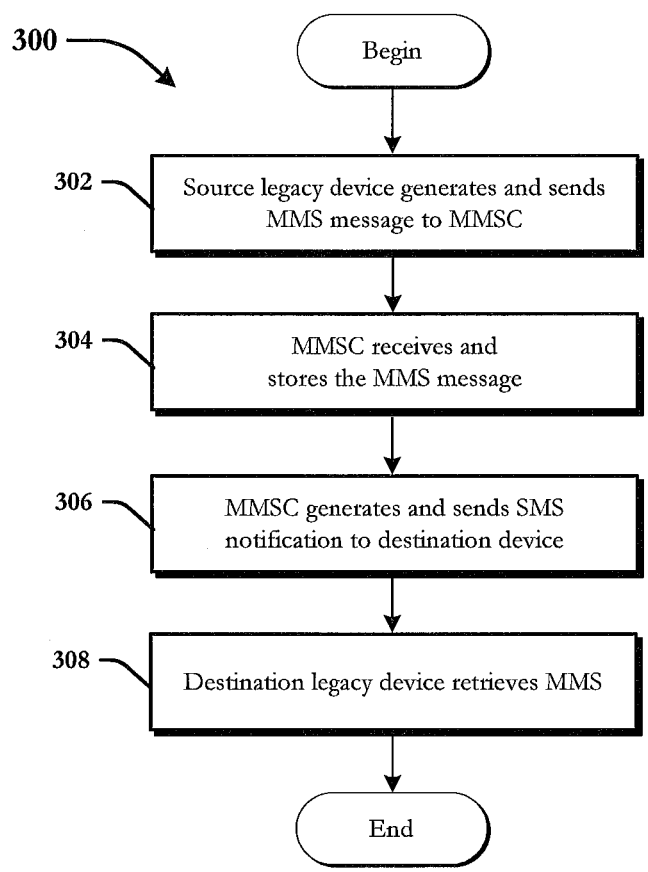
FIG. 3 illustrates a method for providing MMS between legacy devices, according to an exemplary embodiment of the subject disclosure.

FIG. 3 illustrates a method 300 for providing MMS between legacy devices is in the MMS architecture 200, according to an exemplary embodiment of the subject disclosure. It should be understood that the steps of the method 300 are not necessarily presented in any particular order and that performance of some or all the steps in an alternative order(s) is possible and is contemplated. The steps have been presented in the demonstrated order for ease of description and illustration. Steps can be added, omitted and/or performed simultaneously without departing from the scope of the appended claims. It should also be understood that the illustrated method 300 can be ended at any time. Some or all steps of this process, and/or substantially equivalent steps, can be performed by execution of computer-readable instructions included on a computer readable medium.

MMS messaging in the MMS architecture 200 can utilize SMS notification techniques to notify a subscriber that an MMS message is available. For scenarios in which both the source and destination devices are legacy devices that are configured to operate solely utilizing existing SMS protocols, the MMS architecture 200 can facilitate MMS messaging via the illustrated method 300.

The method 300 begins and flow proceeds to block 302 wherein a source legacy device generates and sends an MMS message to the MMSC 118. The MMSC 118 receives and stores the MMS message at block 304. At block 306, the MMSC 118 generates and sends an SMS notification message to the destination legacy device. At block 308, the destination legacy device retrieves the MMS via a URL link provided in the SMS notification. The method 300 can end.

Figure 4:
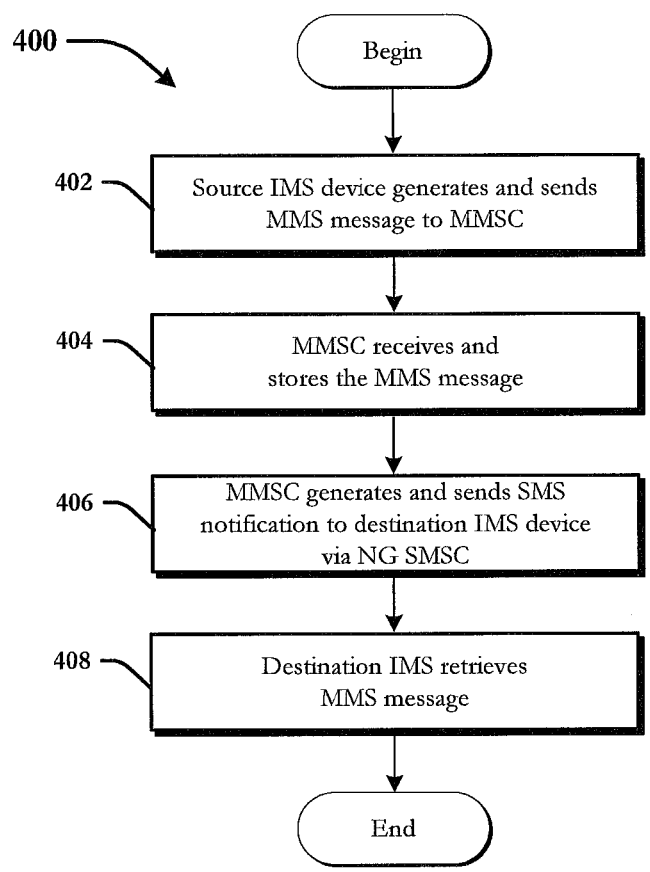
FIG. 4 illustrates a method for providing MMS between IMS devices, according to an exemplary embodiment of the subject disclosure.

FIG. 4 illustrates a method 400 for providing MMS between IMS devices, according to an exemplary embodiment of the subject disclosure. It should be understood that the steps of the method 400 are not necessarily presented in any particular order and that performance of some or all the steps in an alternative order(s) is possible and is contemplated. The steps have been presented in the demonstrated order for ease of description and illustration. Steps can be added, omitted and/or performed simultaneously without departing from the scope of the appended claims. It should also be understood that the illustrated method 400 can be ended at any time. Some or all steps of this process, and/or substantially equivalent steps, can be performed by execution of computer-readable instructions included on a computer readable medium.

MMS messaging in the MMS architecture 200 can utilize SMS notification techniques to notify a subscriber that an MMS message is available. For scenarios in which both the source and destination devices are IMS devices that are configured to operate solely utilizing IMS protocols, the MMS architecture 200 can facilitate MMS messaging via the illustrated method 400.

The method 400 begins and flow proceeds to block 402 wherein a source IMS device generates and sends an MMS message to the MMSC 118 via legacy procedures and protocols (e.g., HTTP). The MMSC 118 receives and stores the MMS message at block 404. At block 406, the MMSC 118 generates and sends and SMS notification to the SMS core network 106, which forwards the SMS message to the NG SMSC 202 via IMS/SMS interworking procedures described above. The NG SMSC 202 encapsulates the SMS message in a SIP message and delivers the SIP message to the destination IMS device. At block 408, the destination IMS device retrieves the MMS message via legacy procedures using, for example, HTTP protocol. The method 400 can end.

Figure 5:
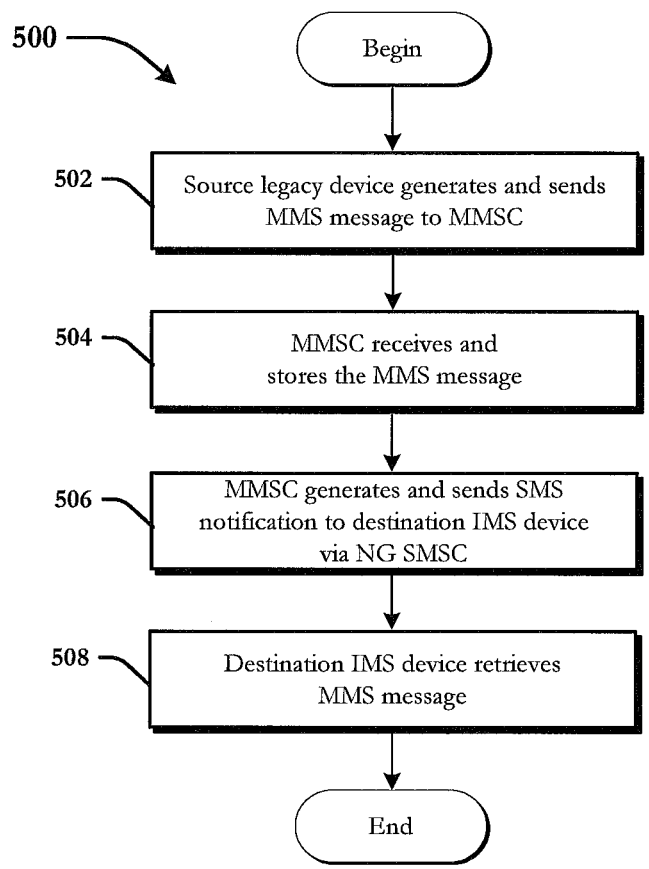
FIG. 5 illustrates a method for providing MMS between a source legacy device and a destination IMS device, according to an exemplary embodiment of the subject disclosure.

FIG. 5 illustrates a method 500 for providing MMS between a source legacy device and a destination IMS device, according to an exemplary embodiment of the subject disclosure. It should be understood that the steps of the method 500 are not necessarily presented in any particular order and that performance of some or all the steps in an alternative order(s) is possible and is contemplated. The steps have been presented in the demonstrated order for ease of description and illustration. Steps can be added, omitted and/or performed simultaneously without departing from the scope of the appended claims. It should also be understood that the illustrated method 500 can be ended at any time. Some or all steps of this process, and/or substantially equivalent steps, can be performed by execution of computer-readable instructions included on a computer readable medium.

MMS messaging in the MMS architecture 200 can utilize SMS notification techniques to notify a subscriber that an MMS message is available. For scenarios in which the source device is a legacy device and the destination device is an IMS device, the MMS architecture 200 can facilitate MMS messaging via the illustrated method 500.

The method 500 begins and flow proceeds to block 502 wherein a source legacy device generates and sends an MMS message to the MMSC 118 via legacy procedures and protocols (e.g., HTTP). The MMSC 118 receives and stores the MMS message at block 504. At block 506, the MMSC 118 generates and sends and SMS notification to the SMS core network 106, which forwards the SMS message to the NG SMSC 202 via IMS/SMS interworking procedures described above. The NG SMSC 202 encapsulates the SMS message in a SIP message and delivers the SIP message to the destination IMS device. At block 508, the destination IMS device retrieves the MMS message via legacy procedures using, for example, HTTP protocol. The method 500 can end.

Figure 6:
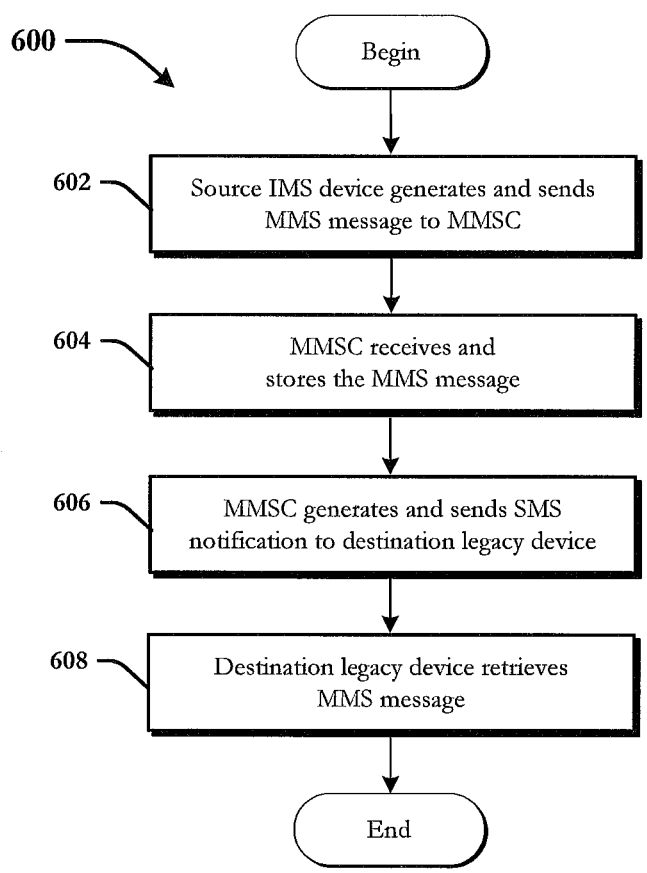
FIG. 6 illustrates a method for providing MMS between a source IMS device and a destination legacy device, according to an exemplary embodiment of the subject disclosure.

FIG. 6 illustrates a method 600 for providing MMS between a source IMS device and a destination legacy device, according to an exemplary embodiment of the subject disclosure. It should be understood that the steps of the method 600 are not necessarily presented in any particular order and that performance of some or all the steps in an alternative order(s) is possible and is contemplated. The steps have been presented in the demonstrated order for ease of description and illustration. Steps can be added, omitted and/or performed simultaneously without departing from the scope of the appended claims. It should also be understood that the illustrated method 600 can be ended at any time. Some or all steps of this process, and/or substantially equivalent steps, can be performed by execution of computer-readable instructions included on a computer readable medium.

MMS messaging in the MMS architecture 200 can utilize SMS notification techniques to notify a subscriber that an MMS message is available. For scenarios in which the source device is an IMS device and the destination device is a legacy device, the MMS architecture 200 can facilitate via the illustrated method 600.

The method 600 begins and flow proceeds to block 602 wherein the source IMS device generates and sends an MMS message to the MMSC 118 via legacy procedures and protocols (e.g., HTTP). The MMSC 118 receives and stores the MMS message at block 604. At block 606, the MMSC 118 generates and sends an SMS notification to the destination legacy device via the SMS core network 106 via legacy procedures and protocols. At block 608, the destination legacy device retrieves the MMS message via legacy procedures and protocols (e.g., HTTP). The method 600 can end.

Figure 7:
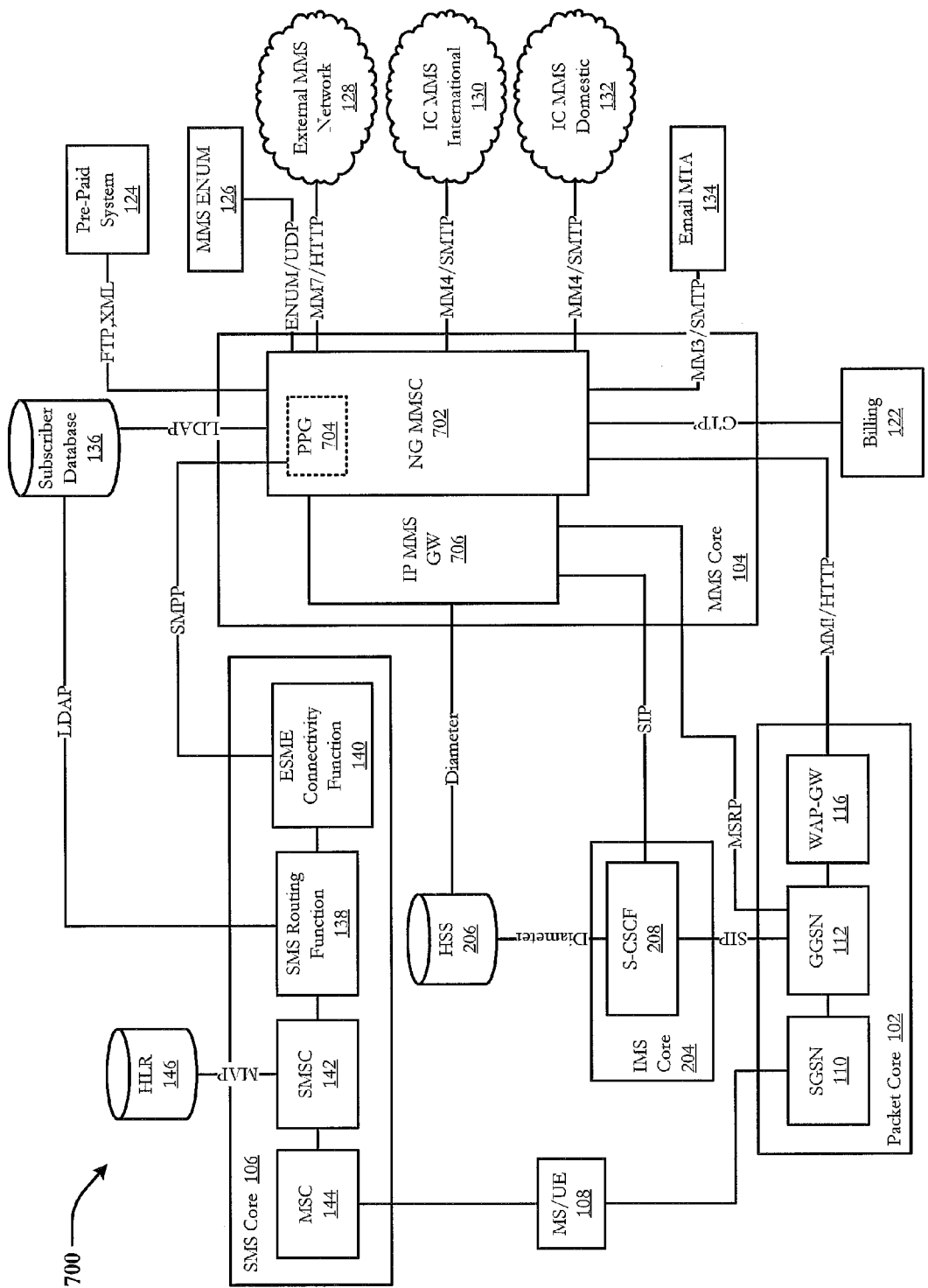
FIG. 7 illustrates an MMS architecture for interworking with an IMS network to provide MMS, according to another exemplary embodiment of the subject disclosure.

FIG. 7 illustrates an MMS architecture 700 for interworking with an IMS network 206 to provide MMS, according to another exemplary embodiment of the subject disclosure. The illustrated MMS architecture 700 replaces the legacy MMSC 118 that is illustrated in FIG. 1 and FIG. 2 with a next generation (NG) MMSC 702. The illustrated NG MMSC 702 includes a push proxy gateway (PPG) 704. The PPG 704 can be configured to push notifications to a destination device with instructions to retrieve an MMS message. For example, the PPG 704 can create and send a notification that includes a URL link to retrieve an MMS message or content associated therewith. The PPG 704 is illustrated as being a function local to the NG MMSC 702, although this is not necessarily the case. In some embodiments, the PPG 704 can be located external to the MMSC 702. In either case and for brevity, the PPG 704 functions are often referred to herein as being performed by the NG MMSC 702.

The illustrated NG MMSC 702 further includes an IP MMS gateway 706 that can be configured to receive to communicated directly with the IMS core network 204 and the packet core network 102 via SIP and message session relay protocol (MSRP), respectively. The IP MMS gateway 706 can also communicate with the HSS 206 to retrieve location and routing information via Diameter protocol. The IP MMS gateway 706 is illustrates as a separate network element, although this is not necessarily the case. The gateway functions provided by the IP MMS gateway 706 can be built-in to the illustrated NG MMSC 702. For purposes of brevity and clarity, the NG MMSC 702 will be referred to herein below as providing the functionality of the IP MMS gateway 706.

The NG MMSC 702 can be configured to perform all the functions of a legacy MMSC, such as the MMSC 118, to support legacy devices operating as the source and/or destination device. The NG MMSC 702 is further configured to communicate with the IMS core network 204 via IMS protocols (e.g., SIP) for facilitating IMS to IMS, legacy to IMS, and IMS to legacy MMS messaging.

The NG MMSC 702 can query the subscriber database 136 via LDAP protocol to determine if the destination subscriber is a legacy subscriber or an IMS subscriber based upon a technology type parameter indicating whether the subscriber's device is a legacy device or an IMS device. For legacy subscribers, the NG MMSC 702 can send and receive MMS messages via legacy MMS procedures without any modifications. For IMS subscribers, the NG MMSC 702 can function as a SIP application server.

The NG MMSC 702 can perform various charging and routing functions in both the MMS core network 104 and the IMS core network 204. For example, the NG MMSC 702 can access the HLR 146, the HSS 206, and a vendor/operator-specific SMS/MMS location registry such as a master subscriber database (e.g., subscriber database 136). In some embodiments, the HLR 146 and the HSS 206 can be combined as a single standards-based IMS HSS that includes both HLR data and IMS subscriber data. Accordingly, the illustrated MMS architecture 700 can provide location and routing functionality for legacy and IMS devices operating on any of the SMS core network 106, the MMS core network 104, or the IMS core network 204, without requiring changes to currently available network components to handle charging and location/routing functions. Thus, the illustrated MMS architecture 700 can provide an efficient interface between MMS and IMS networks with minimal or no changes to current network components and protocols.

The NG MMSC 702 can further include a routing function that can apply communication policies between IMS and/or MMS messages. For example, the routing function can query the pre-paid system 124 to determine if the destination subscriber is a pre-paid or post-paid subscriber for charging and billing purposes.

The NG MMSC 702 can further include a delivery function that can determine location information associated with a message source and a message destination. The delivery function can communicate with the HLR 146 and/or the HSS 206 to determine location and routing information for source and destination devices (e.g., legacy and IMS). In addition, the delivery function can provide store and forward functionality for IMS message and MMS messages bound for destination legacy and IMS devices. Accordingly, IMS and MMS interconnectivity can be provided without modifying IMS core network components (e.g., the S-CSCF 208) to enable such components to access location registries of disparate networks operating on disparate communication protocols.

Before an IMS device can send or receive MMS messages, the IMS device can be required to perform a GPRS/UMTS Attach procedure according to existing GPRS/UMTS Attach procedures. The IMS device can then create a primary packet data protocol (PDP) context according to existing PDP context procedures. The IMS device can then perform a SIP registration procedure with the HSS 206, the S-CSCF 208, and the NG MMSC 702. The registration to the NG MMSC 702 can be a part of the SIP registration or a separate step. After the IMS device is registered, the IMS device can send or receive MMS messages via the NG MMSC 702.

Figure 8:
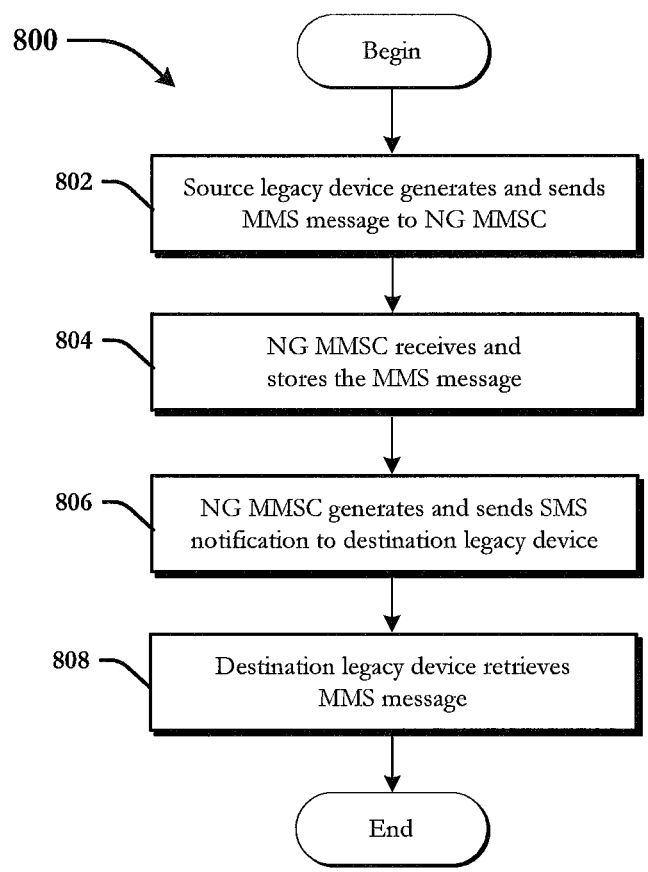
FIG. 8 illustrates a method for providing MMS between legacy devices via a Next Generation (NG) Multimedia Message Service Center (MMSC), according to an exemplary embodiment of the subject disclosure.

FIG. 8 illustrates a method 800 for providing MMS between legacy devices via the NG MMSC 702 is illustrated, according to an exemplary embodiment of the subject disclosure. It should be understood that the steps of the method 800 are not necessarily presented in any particular order and that performance of some or all the steps in an alternative order(s) is possible and is contemplated. The steps have been presented in the demonstrated order for ease of description and illustration. Steps can be added, omitted and/or performed simultaneously without departing from the scope of the appended claims. It should also be understood that the illustrated method 800 can be ended at any time. Some or all steps of this process, and/or substantially equivalent steps, can be performed by execution of computer-readable instructions included on a computer readable medium.

MMS messaging in the MMS architecture 700 can utilize the NG MMSC 702 to perform IMS/MMS interworking functionality to deliver MMS messages to legacy and IMS devices regardless of the source device technology type. For scenarios in which both the source and destination devices are legacy devices, the MMS architecture 700 can facilitate MMS messaging via the illustrated method 800.

The method 800 begins and flow proceeds to block 802 wherein a source legacy device generates and sends an MMS message to the NG MMSC 702. In this embodiment, the NG MMSC 702 functions as a legacy MMSC, such as the MMSC 118. Accordingly, the NG MMSC 702 receives and stores the MMS message at block 804. At block 806, the NG MMSC 702 generates and sends an SMS notification to the destination legacy device via the SMS core network 106 using legacy procedures and protocols. At block 808, the destination legacy device can retrieve the MMS message via legacy procedures and protocols. The method 800 can end.

Figure 9:
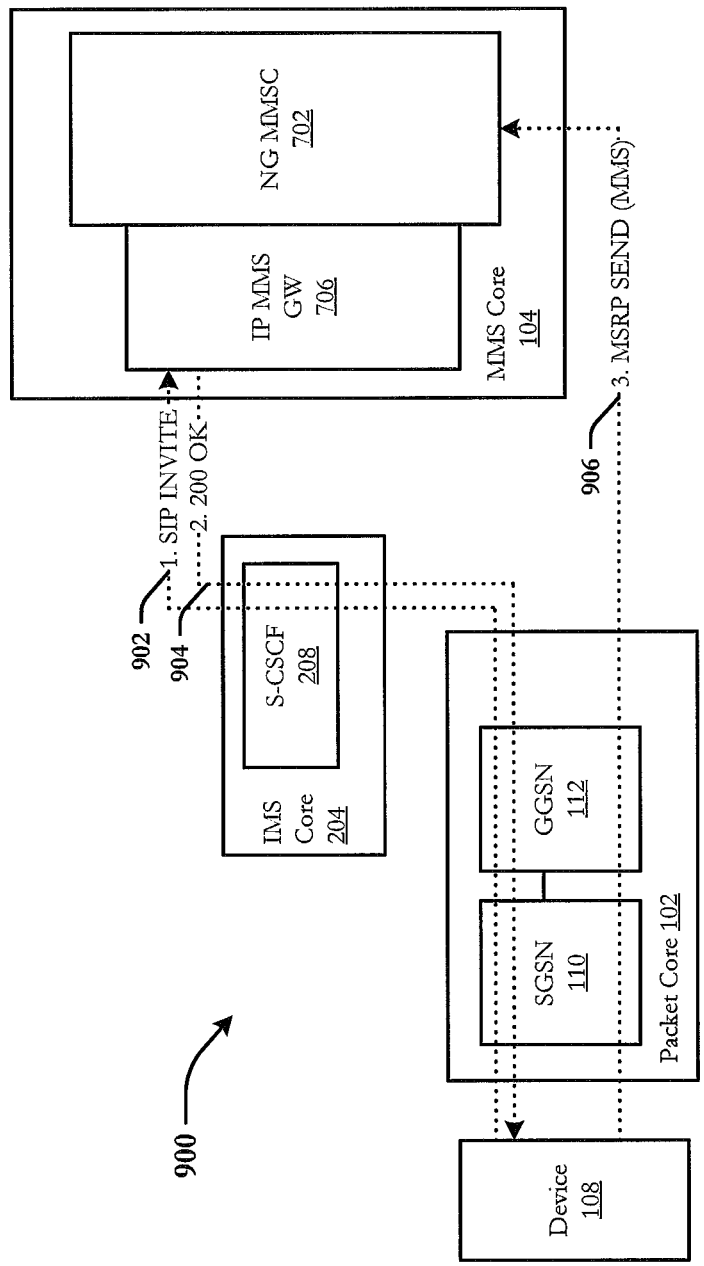
FIG. 9 illustrates a message flow between a source IMS device and an NG MMSC, according to an exemplary embodiment of the subject disclosure.

FIG. 9 illustrates a message flow 900 between a device 108 and an NG MMSC 702, according to an exemplary embodiment of the subject disclosure. The device 108 can send a SIP INVITE message 902 to the NG MMSC 702 via the packet core 102 to initiate an SIP session. The NG MMSC 702 can receive and process the SIP INVITE message and respond with an acknowledge message, for example, a 200 OK message 904 to establish the SIP session. In response to the acknowledge message, the device 108 can encapsulate an MMS message in an MSRP message 906 and send the MSRP message 906 to the NG MMSC 702. The NG MMSC 702 can de-encapsulate the MMS message and store the MMS message for further delivery to the destination device.

Figure 10:
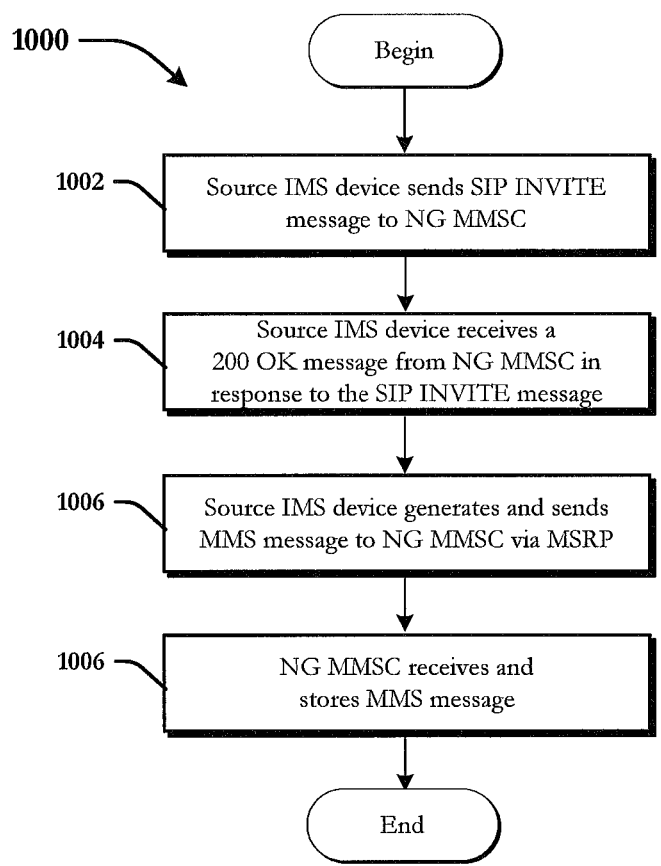
FIG. 10 illustrates a method for sending an MMS message from a source IMS device to an NG MMSC, according to an exemplary embodiment of the subject disclosure.

FIG. 10 illustrates a method for sending an MMS message from a source IMS device to an NG MMSC, according to an exemplary embodiment of the subject disclosure. It should be understood that the steps of the method 1000 are not necessarily presented in any particular order and that performance of some or all the steps in an alternative order(s) is possible and is contemplated. The steps have been presented in the demonstrated order for ease of description and illustration. Steps can be added, omitted and/or performed simultaneously without departing from the scope of the appended claims. It should also be understood that the illustrated method 1000 can be ended at any time. Some or all steps of this process, and/or substantially equivalent steps, can be performed by execution of computer-readable instructions included on a computer readable medium.

The method 1000 is described with reference to FIG. 9. The method 1000 begins and flow can proceed to block 1002 wherein the source IMS device sends a SIP INVITE message 902 to the NG MMSC 702. The source IMS device receives an acknowledge message, for example, a 200 OK message 904 in response to the SIP INVITE, at block 1004. At block 1006, the source IMS device generates and sends an MMS message encapsulated in an MSRP message to the NG MMSC 702. At block 1008, the NG MMSC 702 receives, de-encapsulates, and stores the MMS message for further delivery to the destination device. The method 1000 can end.

Figure 11:
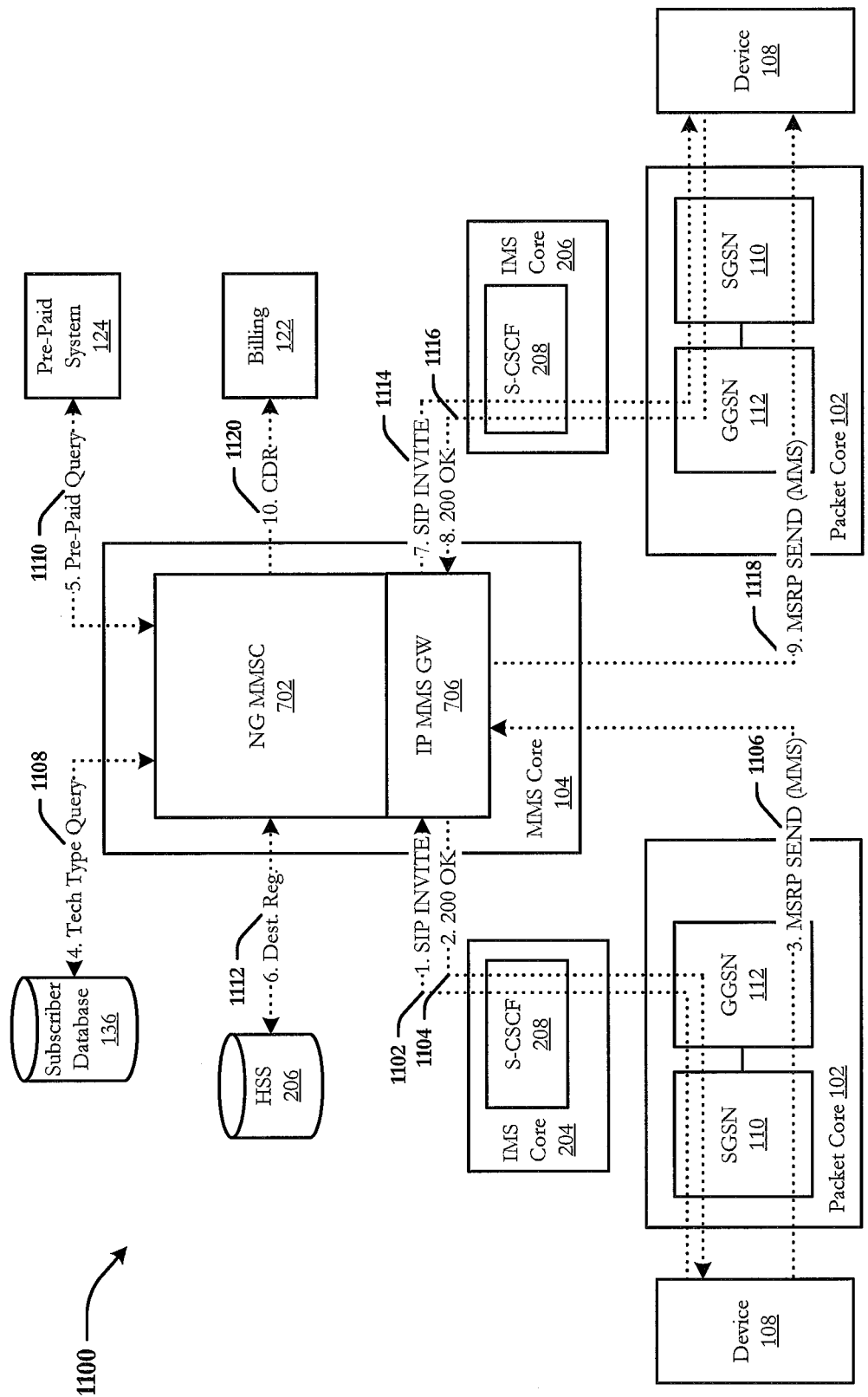
FIG. 11 illustrates a message flow between IMS devices, according to an exemplary embodiment of the subject disclosure.

FIG. 11 illustrates a message flow 1100 between IMS devices 108, 1101, according to an exemplary embodiment of the subject disclosure. The source IMS device 108 can send a SIP INVITE message 1102 to the NG MMSC 702 via the packet core 102 to initiate a SIP session. The NG MMSC 702 can receive and process the SIP INVITE message and respond with an acknowledge message, for example, a 200 OK message 1104 to establish the SIP session. In response to the acknowledge message, the device 108 can encapsulate an MMS message in an MSRP message 1106 and send the MSRP message 1106 to the NG MMSC 702. The NG MMSC 702 can de-encapsulate the MMS message and store the MMS message for further delivery to the destination IMS device 1101.

The NG MMSC 702 can perform a technology type query 1108 to retrieve the technology type of the destination device. In the illustrated embodiment, the destination device is an IMS device 1101 and accordingly the previously stored MMS message is to be sent to the destination IMS device 1101 via the new procedures and protocols described herein. The NG MMSC 702 can send a pre-paid query 1110 to the pre-paid system 124 to determine if the destination subscriber is a pre-paid or post-paid subscriber for charging and billing purposes. In addition, the NG MMSC 702 can query the HSS 204 to determine if the destination IMS device 1101 is registered. If the destination IMS device 1101 is not registered, the NG MMSC 702 can continue to store the MMS message until the destination IMS device 1101 registers. If the destination IMS device 1101 is registered, the NG MMSC 702 can send a SIP INVITE 1114 to the destination IMS device 1101 to initiate a SIP session. The destination IMS device 1101 can respond with a 200 OK message 1116 to establish the SIP session. The NG MMSC 702 can encapsulate the MMS message in an MSRP message 1118 and deliver the MSRP message 1118 to the destination IMS device 1101. The destination IMS device 1101 can de-encapsulate the MMS message and present the content to the destination subscriber. The NG MMSC 702 can also generate and send a CDR to the billing system 122 for billing purposes. It is contemplated that the SIP session established between the source IMS device 108 and the NG MMSC 702 and the SIP session established between the NG MMSC 702 and the destination IMS device 1101 can be the same SIP session or different SIP sessions, for example.

Figure 12:
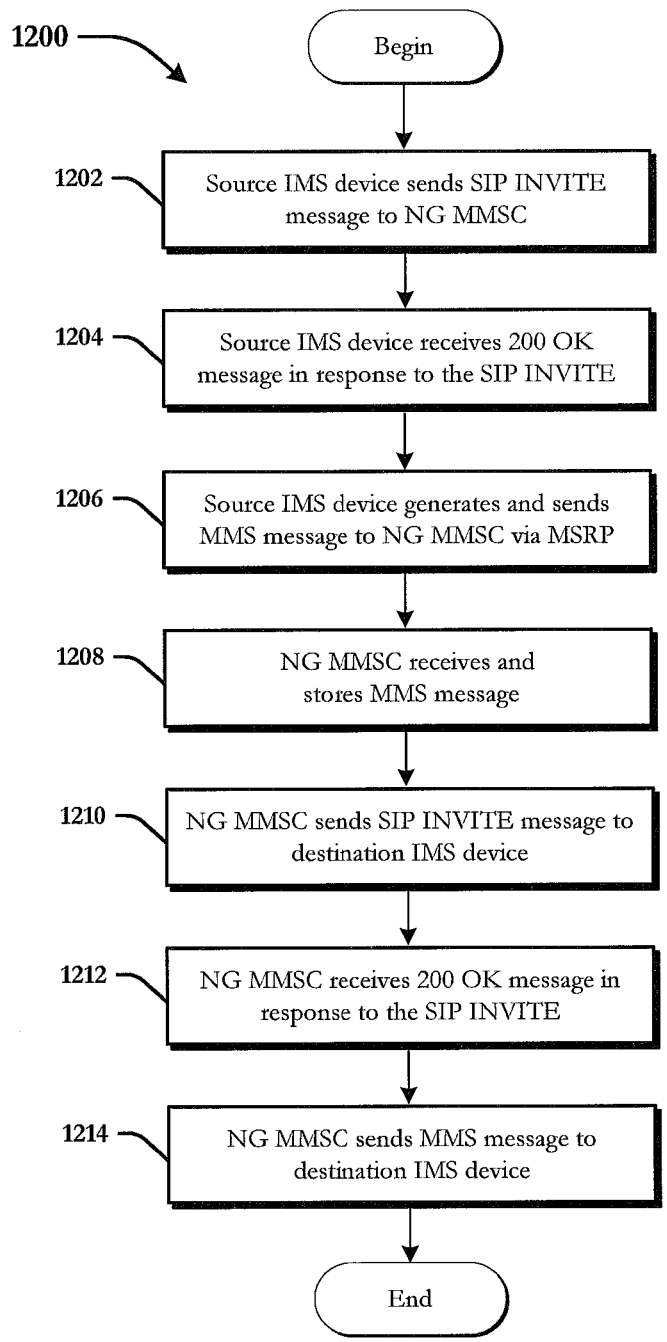
FIG. 12 illustrates a method for providing MMS between IMS devices via an NG MMSC, according to an exemplary embodiment of the subject disclosure.

FIG. 12 illustrates a method 1200 for providing MMS between IMS devices via an NG MMSC 702, according to an exemplary embodiment of the subject disclosure. It should be understood that the steps of the method 1200 are not necessarily presented in any particular order and that performance of some or all the steps in an alternative order(s) is possible and is contemplated. The steps have been presented in the demonstrated order for ease of description and illustration. Steps can be added, omitted and/or performed simultaneously without departing from the scope of the appended claims. It should also be understood that the illustrated method 1200 can be ended at any time. Some or all steps of this process, and/or substantially equivalent steps, can be performed by execution of computer-readable instructions included on a computer readable medium.

The method 1200 is described with reference to FIG. 11. The method 1200 begins and flow proceeds to block 1202 wherein the source IMS device 108 sends a SIP INVITE message 1102 to the NG MMSC 702 to initiate a SIP session. At block 1204, the source IMS device 108 receives a 200 OK message 1104 in response to the SIP INVITE to establish the SIP session. At block 1206, the source IMS device 108 generates an MMS message, encapsulates the MMS message in an MSRP message 1106, and sends the encapsulated MSRP message 1106 to the NG MMSC 702. At block 1208, the NG MMSC 702 receives the MSRP message 1106, de-encapsulates the MMS message, and stores the MMS message for further delivery to the destination IMS device 1101. At block 1210, the NG MMSC 702 sends a SIP INVITE message 1114 to the destination IMS device 1101 to initiate a SIP session. At block 1212, the NG MMSC 702 receives a 200 OK message 1116 in response to the SIP INVITE to establish the SIP session. At block 1214, the NG MMSC 702 encapsulates the MMS message in an MSRP message 1118 and sends the MSRP message to the destination IMS device 1101. The method 1200 can end. It is contemplated that the SIP session established between the source IMS device 108 and the NG MMSC 702 and the SIP session established between the NG MMSC 702 and the destination IMS device 1101 can be the same SIP session or different SIP sessions, for example.

Figure 13:
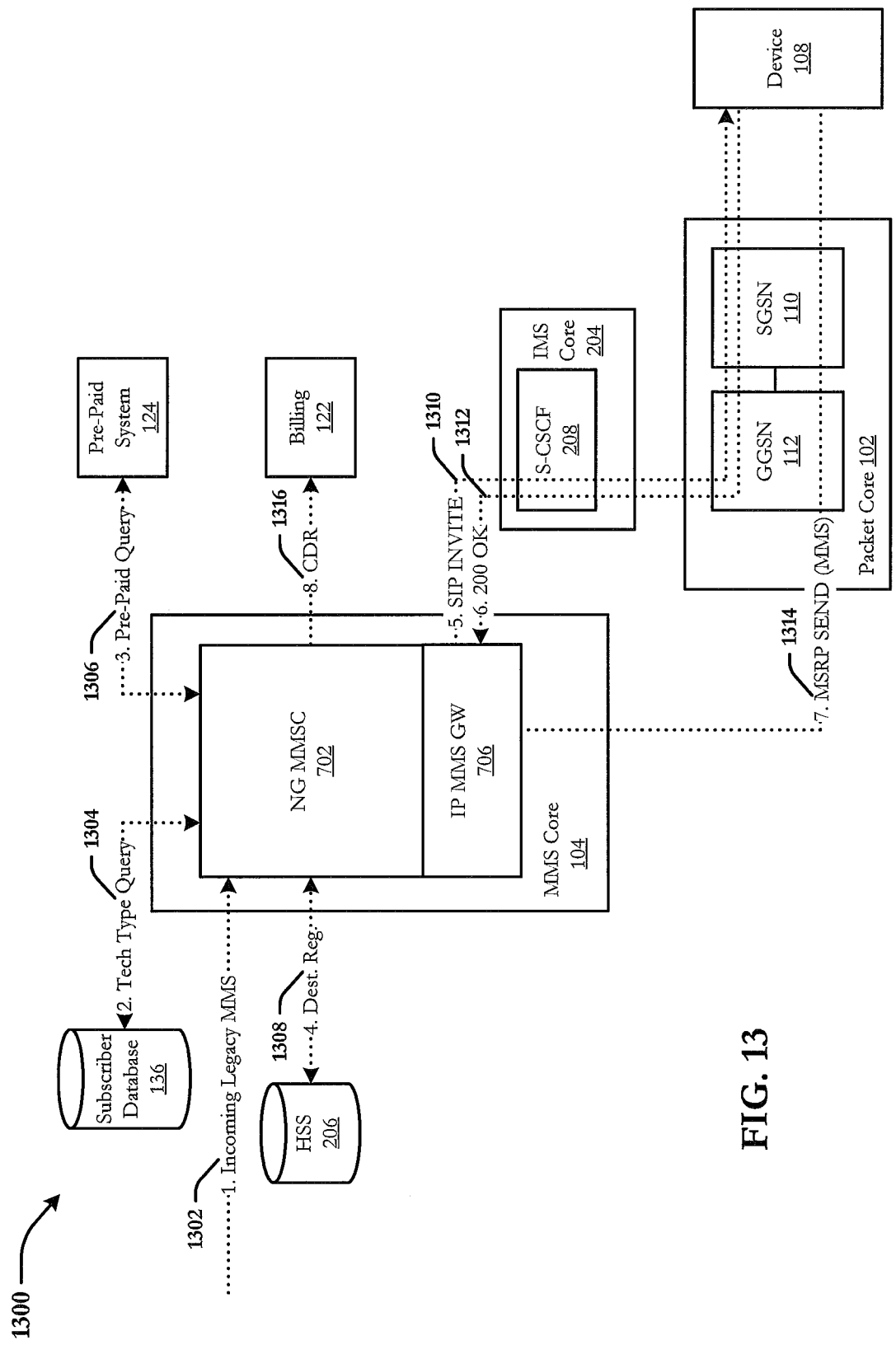
FIG. 13 illustrates a message flow between a source legacy device and a destination IMS device via an NG MMSC, according to an exemplary embodiment of the subject disclosure.

FIG. 13 illustrates a message flow 1300 between a source legacy device (not shown) and a destination IMS device 1101 via an NG MMSC 702, according to an exemplary embodiment of the subject disclosure. The NG MMSC 702 can receive an incoming MMS message 1302 from a source legacy device sent via existing protocols and procedures for legacy MMS. The NG MMSC 702 can store the MMS message for further delivery to the destination IMS device 1101. As described above, the NG MMSC 702 can perform various queries including a technology type query 1304 and a pre-paid query 1306 prior to initializing a SIP session with the destination IMS device 1101. Further, the NG MMSC 702 can query 1308 the HSS 204 to determine if the destination IMS device 1101 is registered. If the destination IMS device 1101 is registered, the NG MMSC 702 sends a SIP INVITE message 1310 to the destination IMS device 1101 to initiate the SIP session. The destination IMS device 1101 can respond with a 200 OK message 1312 to establish the SIP session. The NG MMSC 702 can then encapsulate the stored MMS message in an MSRP message 1314 and send the MSRP message 1314 to the destination IMS device 1101. The NG MMSC 702 can generate and send a CDR 1316 to the billing system 122 for billing purposes.

Figure 14:
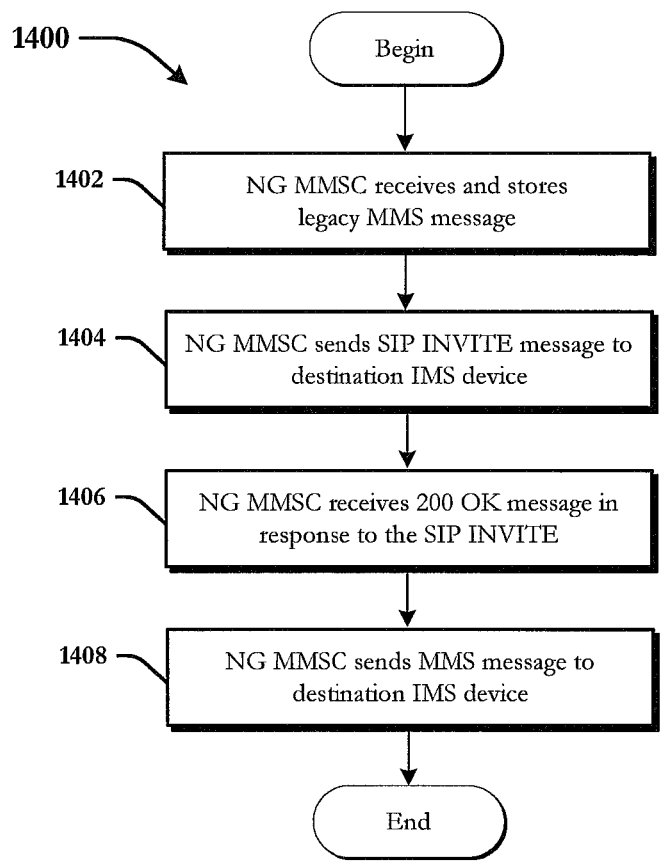
FIG. 14 illustrates a method for receiving a legacy MMS at an NG MMSC and handling delivery to a destination IMS device, according to an embodiment of the subject disclosure.

FIG. 14 illustrates a method 1400 for receiving a legacy MMS message at an NG MMSC 702 and handling delivery to a destination IMS device 108, according to an embodiment of the subject disclosure. It should be understood that the steps of the method 1400 are not necessarily presented in any particular order and that performance of some or all the steps in an alternative order(s) is possible and is contemplated. The steps have been presented in the demonstrated order for ease of description and illustration. Steps can be added, omitted and/or performed simultaneously without departing from the scope of the appended claims. It should also be understood that the illustrated method 1400 can be ended at any time. Some or all steps of this process, and/or substantially equivalent steps, can be performed by execution of computer-readable instructions included on a computer readable medium.

The method 1400 is described with reference to FIG. 13. The method 1400 begins and flow proceeds to block 1402 wherein the NG MMSC 702 receives and stores a legacy MMS message. At block 1404, the NG MMSC 702 sends a SIP INVITE message 1310 to the destination IMS device 1101 to initiate a SIP session. At block 1406, the NG MMSC 702 receives a 200 OK message 1312 in response to the SIP INVITE to establish the SIP session. At block 1408, the NG MMSC 702 encapsulates the MMS message in an MSRP message 1314 and sends the MSRP message 1314 to the destination IMS device 1101. The method 1400 can end.

Figure 15:
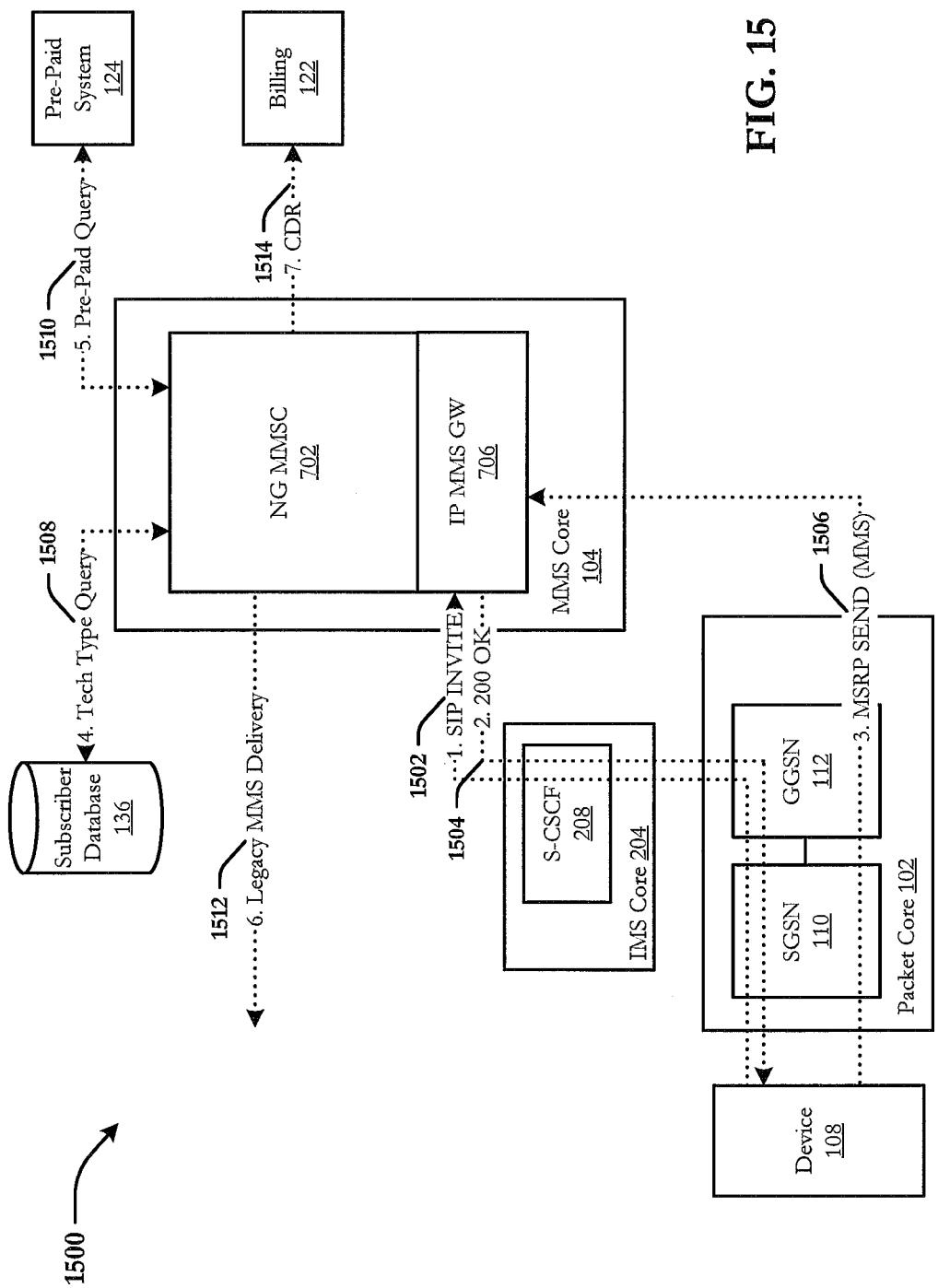
FIG. 15 illustrates a message flow between a source IMS device and a destination legacy device via an NG MMSC, according to an exemplary embodiment of the subject disclosure.

FIG. 15 illustrates a message flow 1500 between a source IMS device 108 and a destination legacy device (not shown) via an NG MMSC 702, according to an exemplary embodiment of the subject disclosure. The source IMS device 108 can send a SIP INVITE message 1502 to the NG MMSC 702 to initiate an SIP session. The NG MMSC 702 can receive and process the SIP INVITE message and respond with a 200 OK message 1504 to establish the SIP session. In response to the 200 OK message 1504, the source IMS device 108 can encapsulate an MMS message in an MSRP message 1506 and send the MSRP message 1506 to the NG MMSC 702. The NG MMSC 702 can de-encapsulate the MMS message and store the MMS message for further delivery to the destination legacy device. The NG MMSC 702 can perform a technology type query 1508 and a pre-paid query 1510 as described above. The NG MMSC 702 can de-encapsulate the MMS message and deliver it to the legacy destination device via legacy MMS procedures and protocols.

Figure 16:
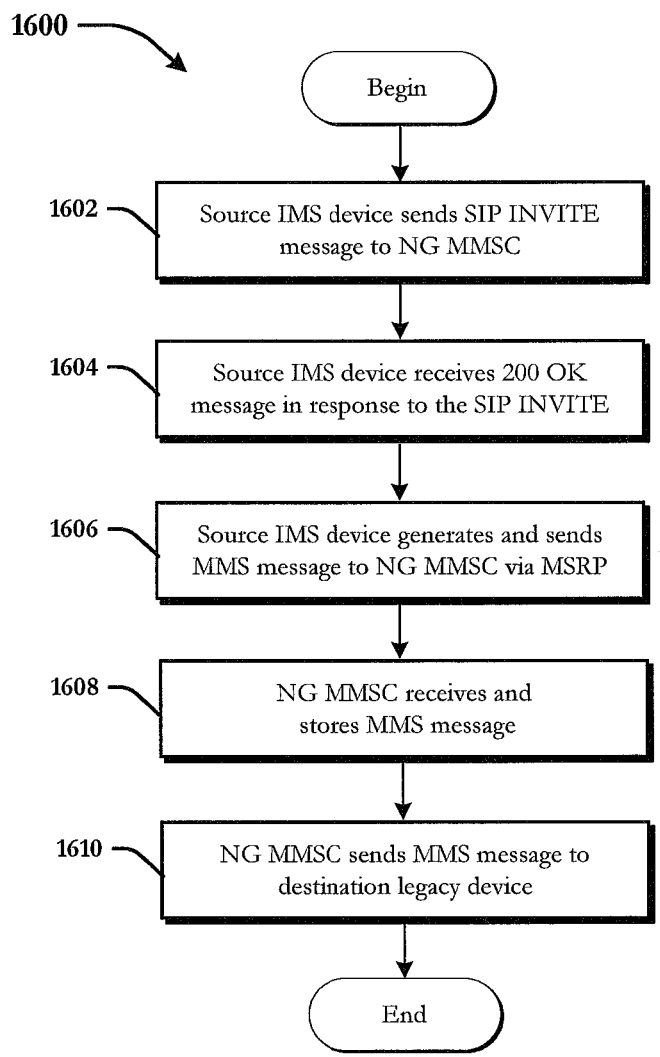
FIG. 16 illustrates a method for providing MMS between a source IMS device and a destination legacy device via an NG MMSC, according to an exemplary embodiment of the subject disclosure.

FIG. 16 illustrates a method 1600 for providing MMS between a source IMS device 108 and a destination legacy device (not shown) via an NG MMSC 702, according to an exemplary embodiment of the subject disclosure. It should be understood that the steps of the method 1600 are not necessarily presented in any particular order and that performance of some or all the steps in an alternative order(s) is possible and is contemplated. The steps have been presented in the demonstrated order for ease of description and illustration. Steps can be added, omitted and/or performed simultaneously without departing from the scope of the appended claims. It should also be understood that the illustrated method 1600 can be ended at any time. Some or all steps of this process, and/or substantially equivalent steps, can be performed by execution of computer-readable instructions included on a computer readable medium.

The method 1600 is described with reference to FIG. 15. The method 1600 begins and flow can proceed to block 1602 wherein the source IMS device 108 sends a SIP INVITE message 1502 to the NG MMSC 702. The source IMS device 108 receives a 200 OK message 1504 in response to the SIP INVITE, at block 1604. At block 1606, the source IMS device 108 generates and sends an MMS message encapsulated in an MSRP message to the NG MMSC 702. At block 1608, the NG MMSC 702 receives, de-encapsulates, and stores the MMS message for further delivery to the destination legacy device. At block 1610, the NG MMSC 702 sends the MMS message to the destination legacy device via legacy MMS procedures and protocols. The method 1600 can end.

Figure 17:
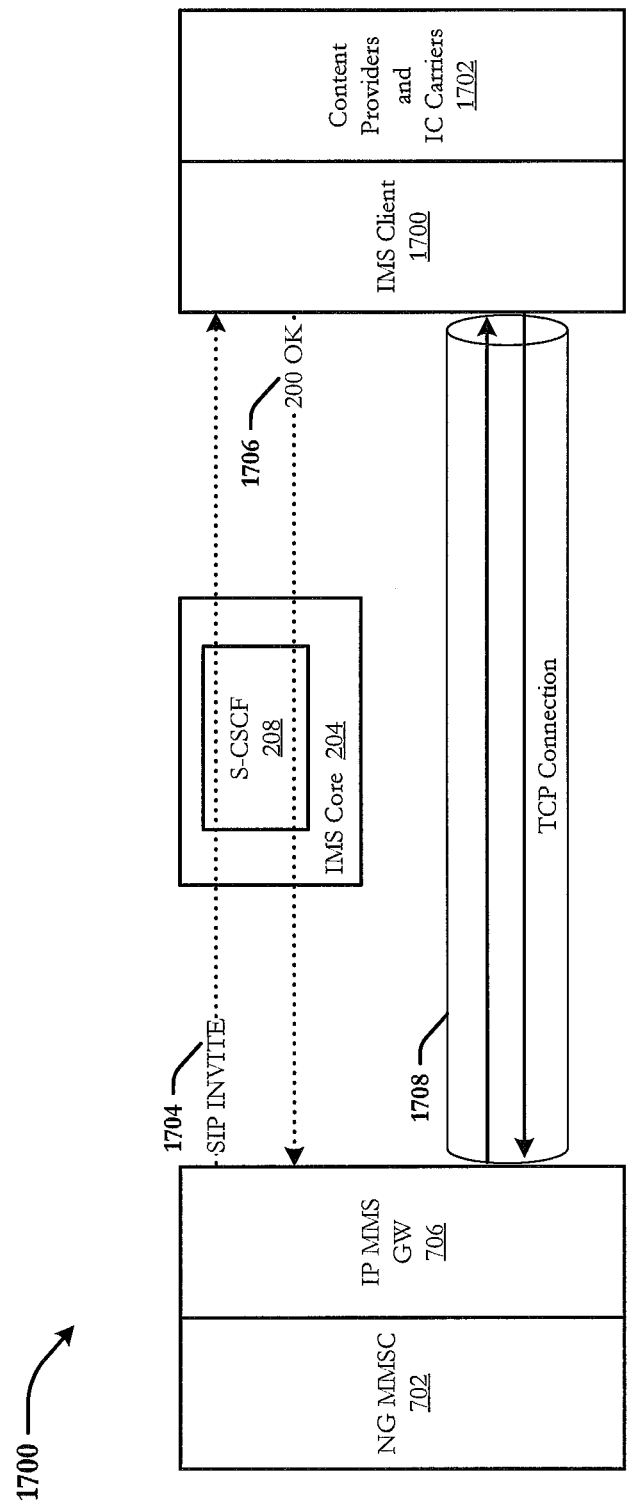
FIG. 17 illustrates a message flow between an NG MMSC and a content provider's IMS client, according to an exemplary embodiment of the subject disclosure.

FIG. 17 illustrates a message flow 1700 between an NG MMSC 702 and a content provider's IMS client 1700, according to an exemplary embodiment of the subject disclosure. In some embodiments, a content provider 1702 can provide MMS-based content that can be sent to the NG MMSC 702 for delivery to one or more subscribers. Accordingly, the NG MMSC 702 can establish a connection with the IMS client 1700 to facilitate such delivery. As illustrated, the NG MMSC 702 can send a SIP INVITE message 1704 to the IMS client 1700 to initiate a SIP session. The IMS client 1700 can respond with a 200 OK message 1706 to establish the SIP session. A TCP connection 1708 can be established between the NG MMSC 702 and the IMS client 1700 for delivery of MMS content.

Figure 18:
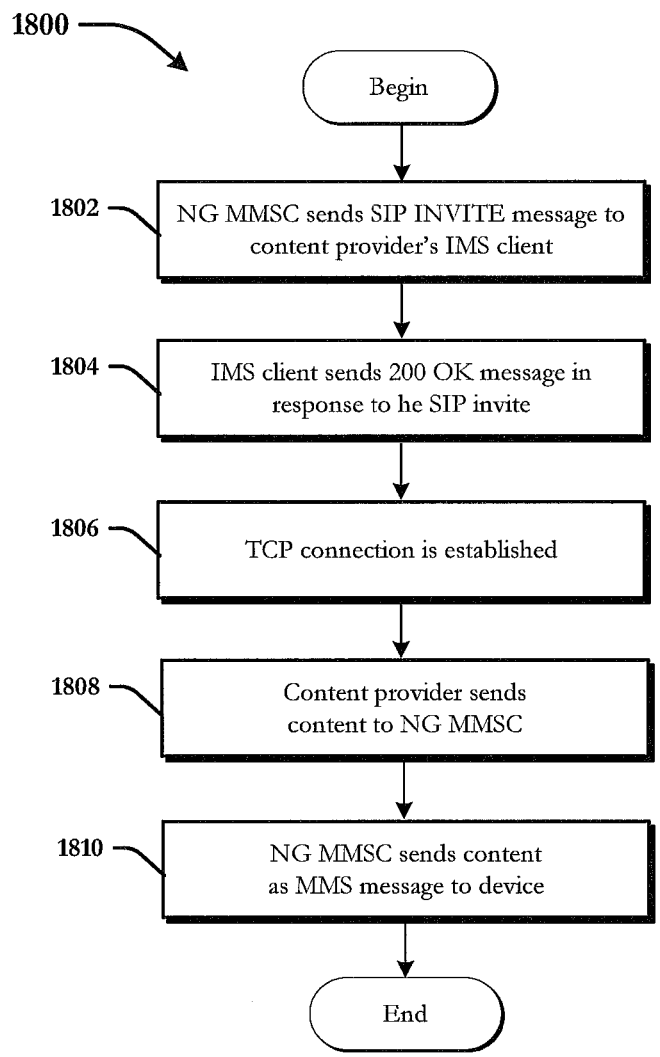
FIG. 18 illustrates a method for providing content to a device from a content provider via an MMS message, according to an exemplary embodiment of the subject disclosure.

FIG. 18 illustrates a method 1800 for providing content to a device from a content provider 1702 via an MMS message, according to an exemplary embodiment of the subject disclosure. It should be understood that the steps of the method 1600 are not necessarily presented in any particular order and that performance of some or all the steps in an alternative order(s) is possible and is contemplated. The steps have been presented in the demonstrated order for ease of description and illustration. Steps can be added, omitted and/or performed simultaneously without departing from the scope of the appended claims. It should also be understood that the illustrated method 1600 can be ended at any time. Some or all steps of this process, and/or substantially equivalent steps, can be performed by execution of computer-readable instructions included on a computer readable medium.

The method 1800 is described with reference to FIG. 17. The method 1800 begins and flow proceeds to block 1802 wherein the NG MMSC 702 sends a SIP INVITE 1704 to the IMS client 1700. At block 1804, the IMS client 1700 sends a 200 OK message 1706 in response to the SIP INVITE message 1704. At block 1808, the content provider 1702 sends MMS content via a TCP connection 1708 to the NG MMSC 702 for storage and further delivery to one or more devices. At block 1810, the NG MMSC 702 sends the content as an MMS message to the destination device(s).

The law does not require and it is economically prohibitive to illustrate and teach every possible embodiment of the present claims. Hence, the above-described embodiments are merely exemplary illustrations of implementations set forth for a clear understanding of the principles of the disclosure. Variations, modifications, and combinations may be made to the above-described embodiments without departing from the scope of the claims. All such variations, modifications, and combinations are included herein by the scope of this disclosure and the following claims.

What is claimed is:

1. A method, comprising:
receiving, by a multimedia message service device comprising a processor, a message session relay protocol message from an Internet protocol multimedia subsystem device;
retrieving, by the multimedia message service device, a multimedia message service message from the message session relay protocol message, wherein the multimedia message service message has been directed to a destination device;
determining, by the multimedia message service device based on information representing a type of the destination device, a communication protocol compatible with the destination device; and
sending, by the multimedia message service device, a short message service message comprising a uniform resource locator link for retrieval of the multimedia message service message directed to the destination device according to the communication protocol.

2. The method of claim 1,
wherein the protocol comprises a session initiation protocol, and wherein the sending further comprises:
establishing, by the multimedia message service device, a session initiation protocol session between the multimedia message service device and the destination device;
including, by the multimedia message service device, the short message service message in a session initiation protocol message; and
sending, by the multimedia message service device, the session initiation protocol message directed to the destination device.

3. The method of claim 1, wherein the protocol comprises a short message service message protocol.

4. The method of claim 1 further comprising:
determining, by the multimedia message service device, whether the destination device is associated with a pre-paid billing account before the sending of the short message service message.

5. The method of claim 1 further comprising:
determining, by the multimedia message service device, whether the destination device corresponds to a registered subscriber prior to the sending of the short message service message.

6. The method of claim 1 further comprising:
generating, by the multimedia message service device, a call record; and
sending, by the multimedia message service device, the call record directed to a billing system.

7. A system, comprising:
a memory that stores executable instructions; and
a processor, coupled to the memory, that facilitates execution of the executable instructions to perform operations comprising:
receiving a message session relay protocol message that has been addressed to a destination device from a source Internet protocol multimedia subsystem device;
retrieving a multimedia message service message from the message session relay protocol message;
in response to determining a type of the destination device, determining a protocol compatible with the type of the destination device; and
sending a short message service message comprising a uniform resource locator link for retrieval of the multimedia message service message directed to the destination device according to the protocol.

8. The system of claim 7, wherein the operations further comprise
establishing a session initiation protocol session with the destination device;
encapsulating the short message service message in a session initiation protocol message; and
sending the session initiation protocol message directed to the destination device.

9. The system of claim 7, wherein the protocol comprises a short message service message protocol.

10. The system of claim 7, wherein the operations further comprise:
determining whether the destination device is associated with a pre-paid billing account.

11. The system of claim 7, wherein the operations further comprise:
determining whether the destination device is registered prior to the sending of the short message service message.

12. The system of claim 7, wherein the operations further comprise:
generating a call record; and
sending the call record directed to a billing system.

13. The system of claim 7, wherein the protocol is a diameter protocol.

14. A non-transitory computer readable medium having stored thereon computer executable instructions that, in response to execution, cause a computing device including a processor to perform operations, the operations comprising:
receiving a message session relay protocol message;
retrieving a multimedia message service message from the message session relay protocol message, wherein the multimedia message service message has been addressed to a destination device;
determining a protocol accepted by the destination device; and
sending a short message service message comprising a uniform resource locator link for retrieval of the multimedia message service message directed to the destination device according to the protocol.

15. The non-transitory computer readable storage medium of claim 14, wherein the operations further comprise:
  querying a data store of pre-paid account information to determine whether the destination device is associated with a pre-paid billing account.

16. The non-transitory computer readable storage medium of claim 14, wherein the operations further comprise:
  querying a home subscriber server device; and
  determining whether the destination device has been registered prior to the sending of the short message service message.

17. The non-transitory computer readable storage medium of claim 14, wherein the operations further comprise:
  generating a call record; and
  sending the call record to a billing system for billing.

18. The non-transitory computer readable storage medium of claim 14, wherein the operations further comprise:
  initiating a session initiation protocol session with the destination device in response to the protocol being determined to be a message session relay protocol.

\* \* \* \* \*